(12) United States Patent
Satoh et al.

(10) Patent No.: US 8,678,540 B2
(45) Date of Patent: Mar. 25, 2014

(54) IMAGE CAPTURING DEVICE AND RECORDING APPARATUS

(75) Inventors: Nobuyuki Satoh, Kanagawa (JP);
Masato Kobayashi, Kanagawa (JP);
Norikazu Taki, Kanagawa (JP);
Daisaku Horikawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 295 days.

(21) Appl. No.: 13/232,460

(22) Filed: Sep. 14, 2011

(65) Prior Publication Data

US 2012/0069411 A1 Mar. 22, 2012

(30) Foreign Application Priority Data

Sep. 16, 2010 (JP) ................................. 2010-208370
Sep. 16, 2010 (JP) ................................. 2010-208381

(51) Int. Cl.
*B41J 29/393* (2006.01)
(52) U.S. Cl.
USPC .......................................................... 347/19
(58) Field of Classification Search
USPC .......................................................... 347/19
See application file for complete search history.

(56) References Cited

U.S. PATENT DOCUMENTS 6,832,824 B1 * 12/2004 Baker et al. ..................... 347/19

FOREIGN PATENT DOCUMENTS

| JP | 3119528 | 10/2000 |
|----|---------|---------|
| JP | 3129502 | 11/2000 |
| JP | 2002-290757 | 10/2002 |
| JP | 2003-24283 | 1/2003 |
| JP | 2005-274771 | 10/2005 |
| JP | 4346356 | 7/2009 |

* cited by examiner

*Primary Examiner* — Julian Huffman
(74) *Attorney, Agent, or Firm* — Oblon, Spivak, McClelland, Maier & Neustadt, L.L.P.

(57) ABSTRACT

An image capturing device includes: a housing; a reference pattern used for color measurement and arranged in the housing; an image capturing element that captures an image of the reference pattern in a first area and an image of an object in a second area of the image capturing area; an image forming element causing the image of the reference pattern and the image of the object to be formed on the image capturing element by being arranged on a first optical path between the image capturing element and the reference pattern and a second optical path between the image capturing element and the object; and an optical member that guides any one of the images of the reference pattern and the object formed by the image forming element so that the images are to be formed on an element surface of the image capturing element.

14 Claims, 21 Drawing Sheets

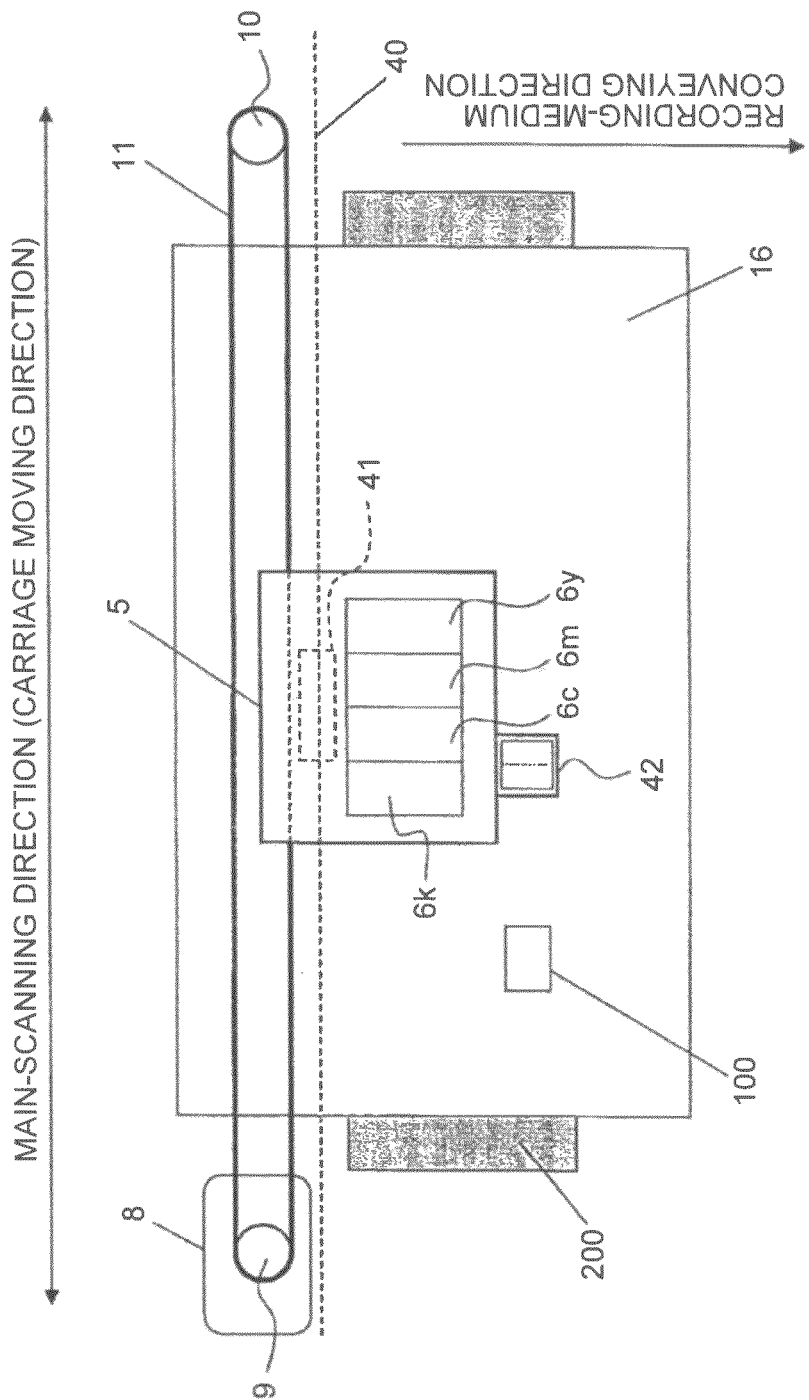

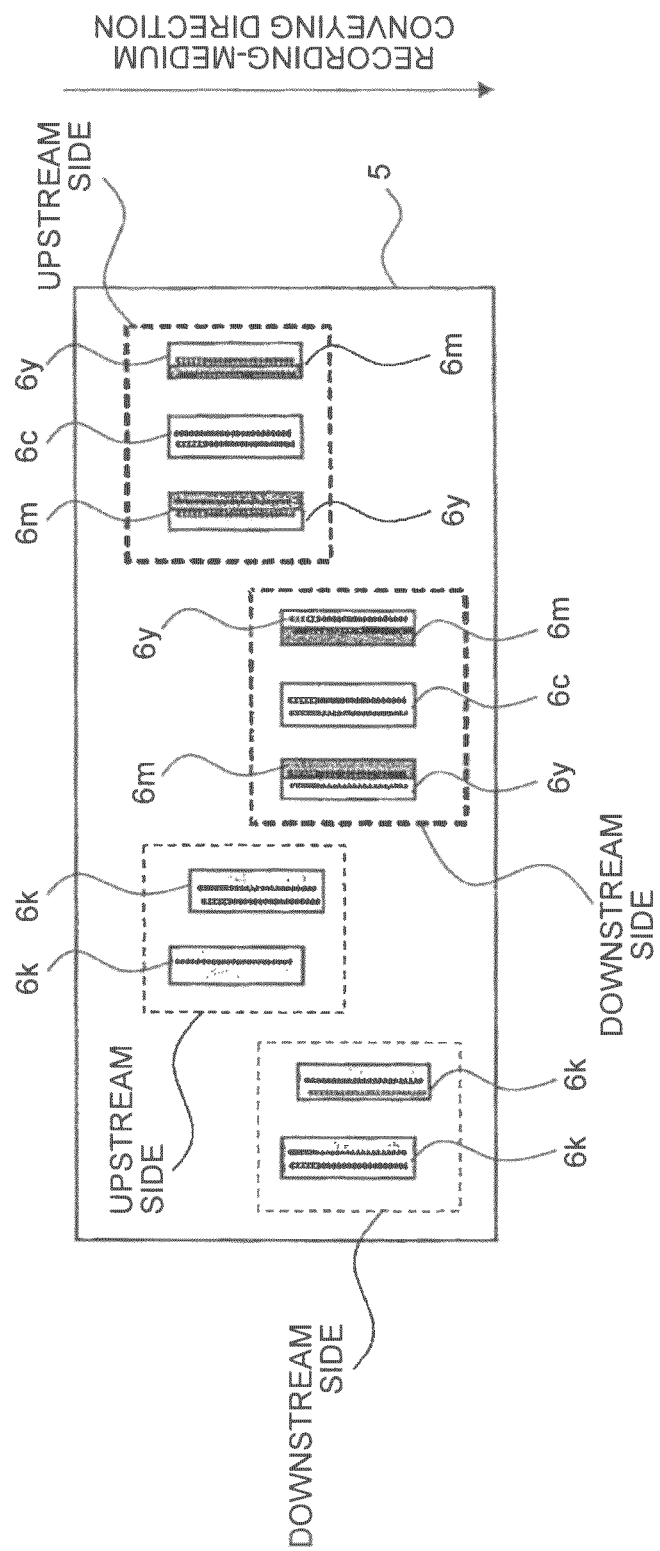

FIG.11A $Lab \Rightarrow XYZ$ $$x_r = \begin{cases} f_x^3 & f_x^3 > 0.008856 \\ (116 \times f_x - 16)/903.3 & f_x^3 \leq 0.008856 \end{cases}$$

$$y_r = \begin{cases} ((L+16)/116)^3 & L > 903.3 \times 0.008856 \\ L/903.3 & L \leq 903.3 \times 0.008856 \end{cases}$$

$$z_r = \begin{cases} f_z^3 & f_z^3 > 0.008856 \\ (116 \times f_z - 16)/903.3 & f_z^3 \leq 0.008856 \end{cases}$$

$$f_x = \frac{a}{500} + f_y$$

$$f_y = \begin{cases} (L+16)/116 & y_r > 0.008856 \\ (903.3 \times y_r + 16)/116 & y_r \leq 0.008856 \end{cases}$$

$$f_z = f_y - \frac{b}{200}$$

$$X = x_r \times X_r$$
$$Y = y_r \times Y_r$$
$$Z = z_r \times Z_r$$

FIG.11B $XYZ \Rightarrow Lab$ $$f_x = \begin{cases} \sqrt[3]{x_r} & x_r > 0.008856 \\ (903.3 \times x_r + 16)/116 & x_r \leq 0.008856 \end{cases}$$

$$f_y = \begin{cases} \sqrt[3]{y_r} & y_r > 0.008856 \\ (903.3 \times y_r + 16)/116 & y_r \leq 0.008856 \end{cases}$$

$$f_z = \begin{cases} \sqrt[3]{z_r} & z_r > 0.008856 \\ (903.3 \times z_r + 16)/116 & z_r \leq 0.008856 \end{cases}$$

$$x_r = X/X_r$$
$$y_r = Y/Y_r$$
$$z_r = Z/Z_r$$
$$L = 116 \times f_y - 16$$
$$a = 500 \times (f_x - f_y)$$
$$b = 200 \times (f_y - f_z)$$

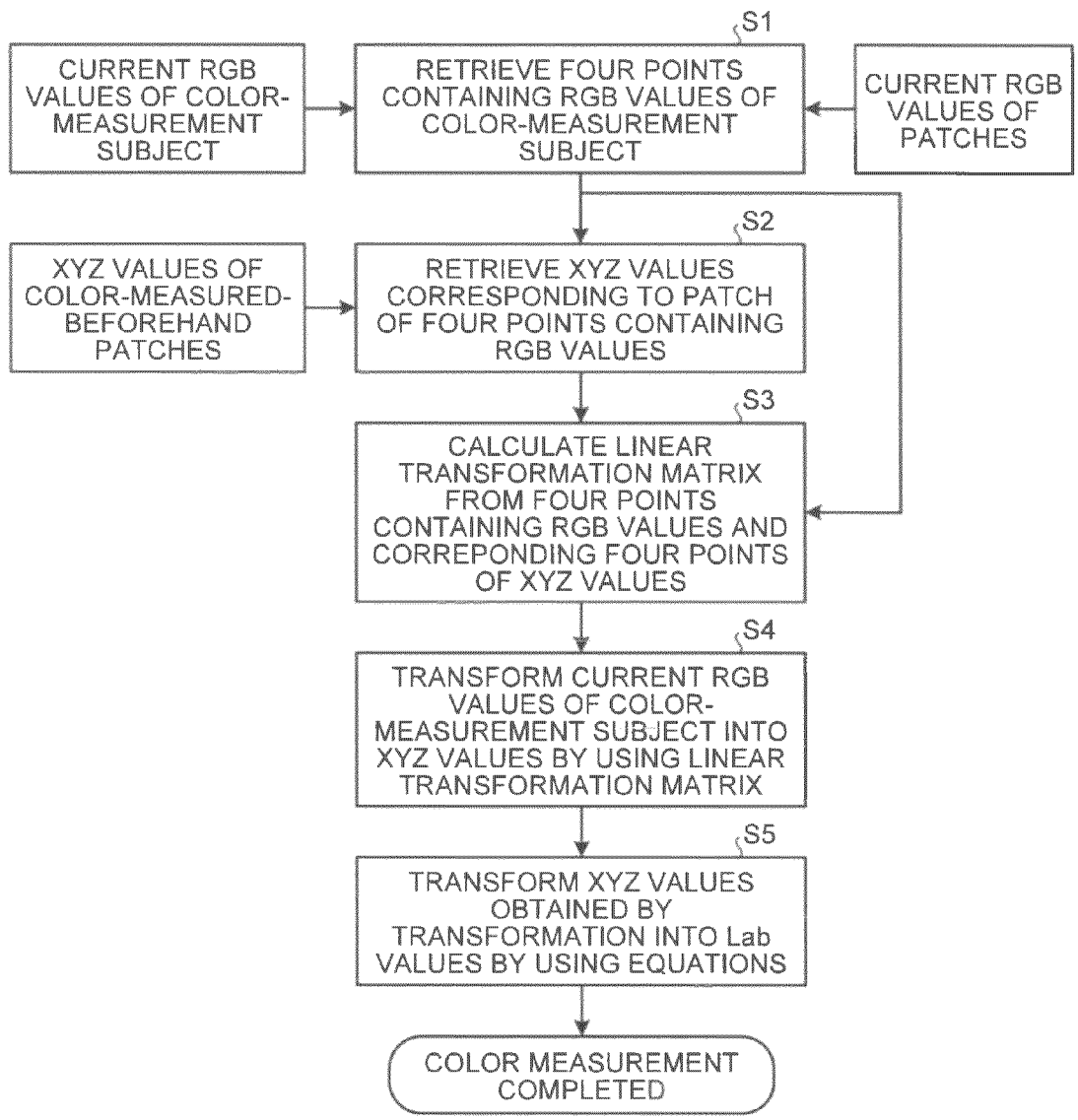

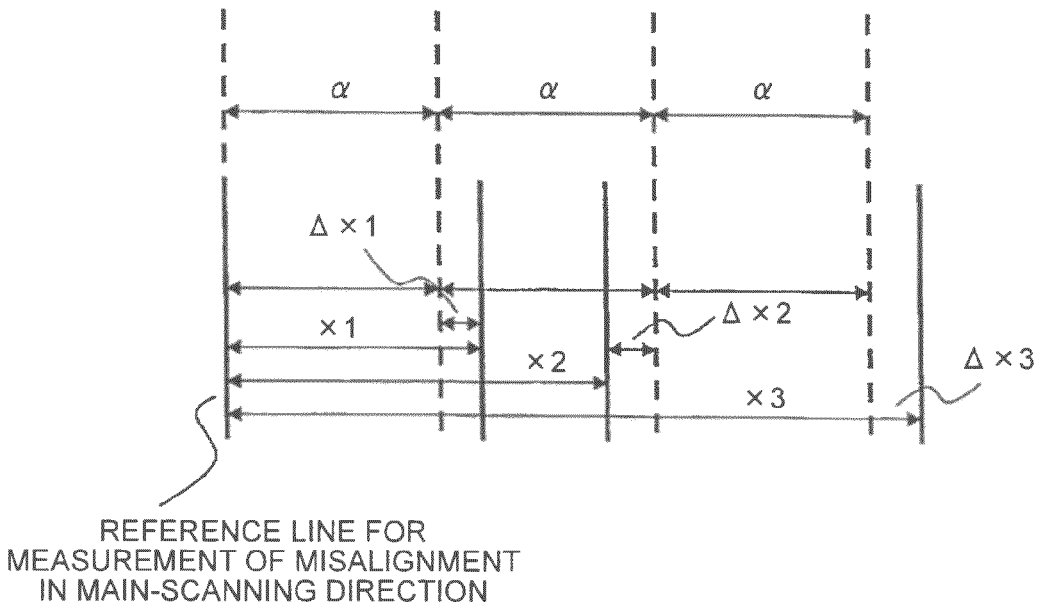

IMAGE CAPTURING DEVICE AND RECORDING APPARATUS

CROSS-REFERENCE TO RELATED APPLICATIONS

The present application claims priority to and incorporates by reference the entire contents of Japanese Patent Application No. 2010-208370 filed in Japan on Sep. 16, 2010 and Japanese Patent Application No. 2010-208381 filed in Japan on Sep. 16, 2010.

BACKGROUND OF THE INVENTION

1. Field of the Invention

The present invention relates to an image capturing device to be mounted on a recording apparatus, such as an inkjet printer, and a recording apparatus including the image capturing device.

2. Description of the Related Art

A typical inkjet recording apparatus ejects ink from a recording head mounted on a carriage while the carriage is reciprocating in the main-scanning direction (direction in which the carriage moves) to cause the ink to stick to a recording medium placed on a supporting plate, thereby recording an image (dots) on the recording medium. The recording apparatus conveys the recording medium in the sub-scanning direction (direction perpendicular to the direction in which the carriage moves) by using a conveying roller or the like and repeatedly performs the recording in the main-scanning direction, thereby forming an image on the recording medium. The supporting plate supports the recording medium while the ink is ejected onto the recording medium.

In the inkjet recording apparatus described above, amounts of ink ejected from the recording heads varies depending on a nozzle condition of the recording heads, fluctuation of viscosities of the ink, variability of piezoelectric elements to be driven for the ejection, and the like. Accordingly, color reproduction of an image to be formed with the ink ejected from the recording heads can disadvantageously vary. While ink ejection amounts of a single apparatus can change with time, ink ejection amounts can vary on an apparatus-by-apparatus basis. Accordingly, also with such a variation, color reproduction of an image to be formed with ink ejected from the recording heads can disadvantageously vary.

In view of these circumstances, some types of the inkjet recording apparatus described above perform control, for example, as follows. A test pattern, which is an object, is formed on a recording medium. Depending on the result of color measurement on the test pattern by using a colorimeter, an amount of ink ejected from recording heads is corrected so that colors of an image to be formed with ink ejected from the recording heads are reproduced without a variance.

Examples of the colorimeter described above include a colorimeter that performs color measurement by using a spectrometer and a colorimeter that performs color measurement by receiving light reflected from the test pattern. Use of a spectrometer improves accuracy in color measurement at the expense of an increase in cost because a spectrometer is relatively expensive. A colorimeter using reflected light is relatively inexpensive with the disadvantage of rather low accuracy in color measurement due to the variance of the reflected light according to an environmental condition.

Therefore, there is a need for developing equipment that is relatively inexpensive and performs very accurate color measurement.

Technical documents applied prior to the present invention include Japanese Patent No. 3129502, in which a technique for increasing accuracy in color measurement by capturing an image of a reference color chart and an image of an object including an object simultaneously or separately to obtain RGB data pertaining to the reference color chart and the object, and correcting the RGB data pertaining to the object based on the RGB data pertaining to the reference color chart is disclosed.

Also disclosed in Japanese Patent No. 3129502 is an aspect that the image of the reference color chart and the image of the object including the object are captured simultaneously to correct the RGB data pertaining to the object.

However, the technique disclosed in Japanese Patent No. 3129502 is based on an assumption that image capturing is performed in a state where an image capturing device and the object are placed at fixed positions. Accordingly, the technique is substantially inapplicable to a case where the image capturing device is to be moved.

SUMMARY OF THE INVENTION

It is an object of the present invention to at least partially solve the problems in the conventional technology.

According to an aspect of the present invention, there is provided an image capturing device including: a housing; a reference pattern used for color measurement, the reference pattern being arranged in the housing; an image capturing element that captures an image of the reference pattern in a first area of an image capturing area and an image of an object in a second area of the image capturing area; an image forming element that causes the image of the reference pattern and the image of the object to be formed on the image capturing element, the image forming element being arranged on a first optical path between the image capturing element and the reference pattern and a second optical path between the image capturing element and the object; and an optical member that guides any one of the image of the reference pattern and the image of the object so that the image of the object formed by the image forming element and the image of the reference pattern formed by the image forming element are to be formed on an element surface of the image capturing element.

According to another aspect of the present invention, there is provided a recording apparatus including a carriage and an image capturing device. The image capturing device includes a housing; a reference pattern used for color measurement, the reference pattern being arranged in the housing; an image capturing element that captures an image of the reference pattern in a first area of an image capturing area and an image of the object in a second area of the image capturing area; an image forming element that causes an image of the reference pattern and an image of the object to be formed on the image capturing element, the image forming element being arranged on a first optical path between the image capturing element and the reference pattern and a second optical path between the image capturing element and the object; and an optical member that guides any one of the image of the reference pattern and the image of the object so that an image of the object formed by the image forming element and an image of the reference pattern formed by the image forming element are to be formed an element surface of the image capturing element. The image capturing device is mounted on the carriage.

The above and other objects, features, advantages and technical and industrial significance of this invention will be better understood by reading the following detailed descrip-

BRIEF DESCRIPTION OF THE DRAWINGS

FIG. 2 is a diagram illustrating an exemplary schematic configuration of a recording mechanism and a detection mechanism of the recording apparatus according to the first embodiment;

FIG. 3 is a diagram illustrating an exemplary configuration of recording heads;

FIGS. 11A and 11B display conversion equations from Lab to XYZ (FIG. 11A) and from XYZ to Lab (FIG. 11B);

FIG. 12 is a diagram for explaining the exemplary method for color measurement of the test pattern;

FIG. 14 is a second diagram for explaining the compensation for misalignment of an image;

FIG. 15 is a third diagram for explaining the compensation for misalignment of an image;

DETAILED DESCRIPTION OF THE PREFERRED EMBODIMENTS

Embodiments of the present invention will be described below with reference to the accompanying drawings.

First Embodiment

An outline of a recording apparatus according to a first embodiment of the present invention will be described below with reference to FIGS. 2 and 4A to 4C.

Figure 4A:
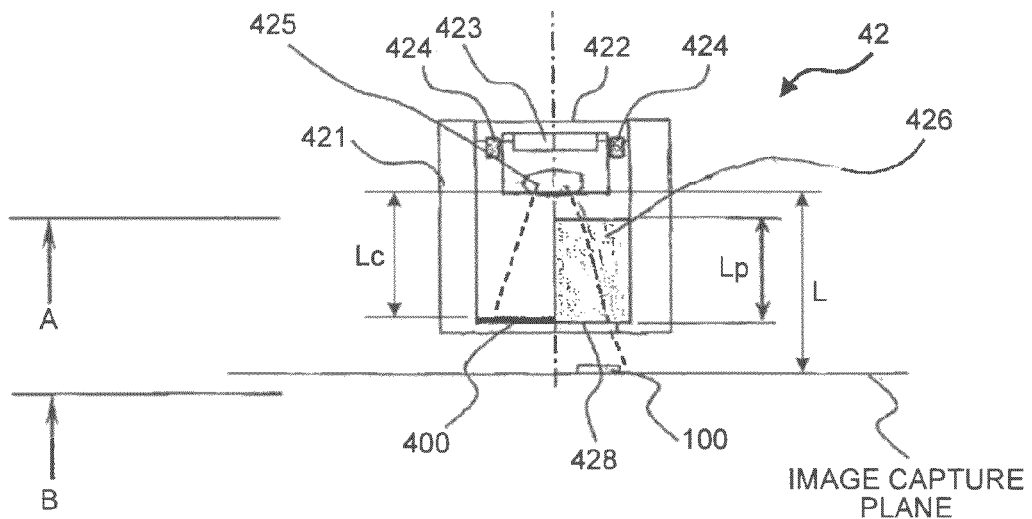
FIGS. 4A to 4C are diagrams illustrating an exemplary configuration of an image capturing unit.
Figure 4B:
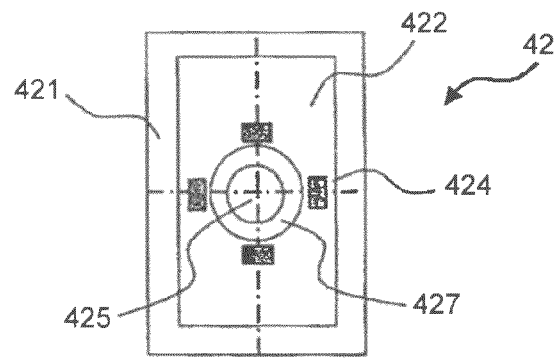
Figure 4C:
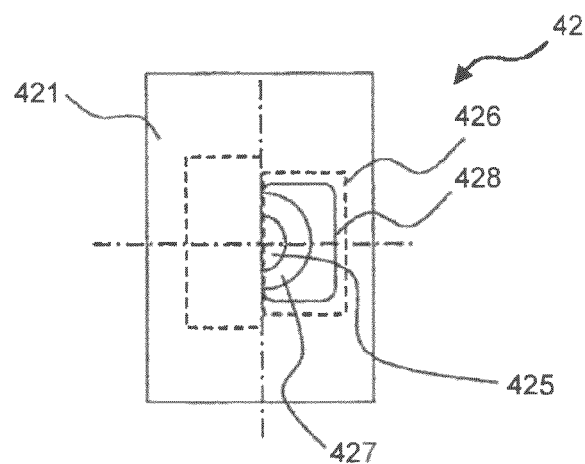

As illustrated in FIG. 2, the recording apparatus according to the first embodiment includes an image capturing unit 42 (image capturing device) mounted on a carriage 5. As illustrated in FIGS. 4A to 4C, the image capturing unit 42 includes a housing 421; a reference pattern (corresponding to a reference chart 400), arranged in the housing 421, used for color measurement; a two-dimensional sensor 423 that captures an image of the reference pattern 400 at a part of an image capturing area and captures an image of a test pattern 100, which is an object, in the other part of the area; an image capturing lens 425 arranged on a first optical path between the two-dimensional sensor 423 and the reference pattern 400 and a second optical path between the two-dimensional sensor 423 and the test pattern 100 to cause the image of the reference pattern 400 to be formed on a sensor surface of the two-dimensional sensor 423; and a transparent member 426 arranged on the second optical path between the two-dimensional sensor 423 and the test pattern 100 and having a refractive index that causes an image of the test pattern 100 formed by the image capturing lens 425 to be positioned on the sensor surface of the two-dimensional sensor 423.

The image capturing unit 42 of the first embodiment includes the reference pattern 400 to be used in color measurement inside the image capturing unit 42. The transparent member 426 causes the image of the reference pattern 400 and the image of the test pattern 100 of the object to be formed on the sensor surface of the two-dimensional sensor 423. Accordingly, the image capturing unit 42 can be used even when the image capturing unit 42 is in motion. Furthermore, accuracy in the color measurement of the test pattern 100 can be increased while keeping the production of the image capturing unit 42 less costly. The recording apparatus according to the first embodiment will be described in detail below with reference to the accompanying drawings.

Exemplary Schematic Configurations of Mechanisms of Recording Apparatus

Figure 1:
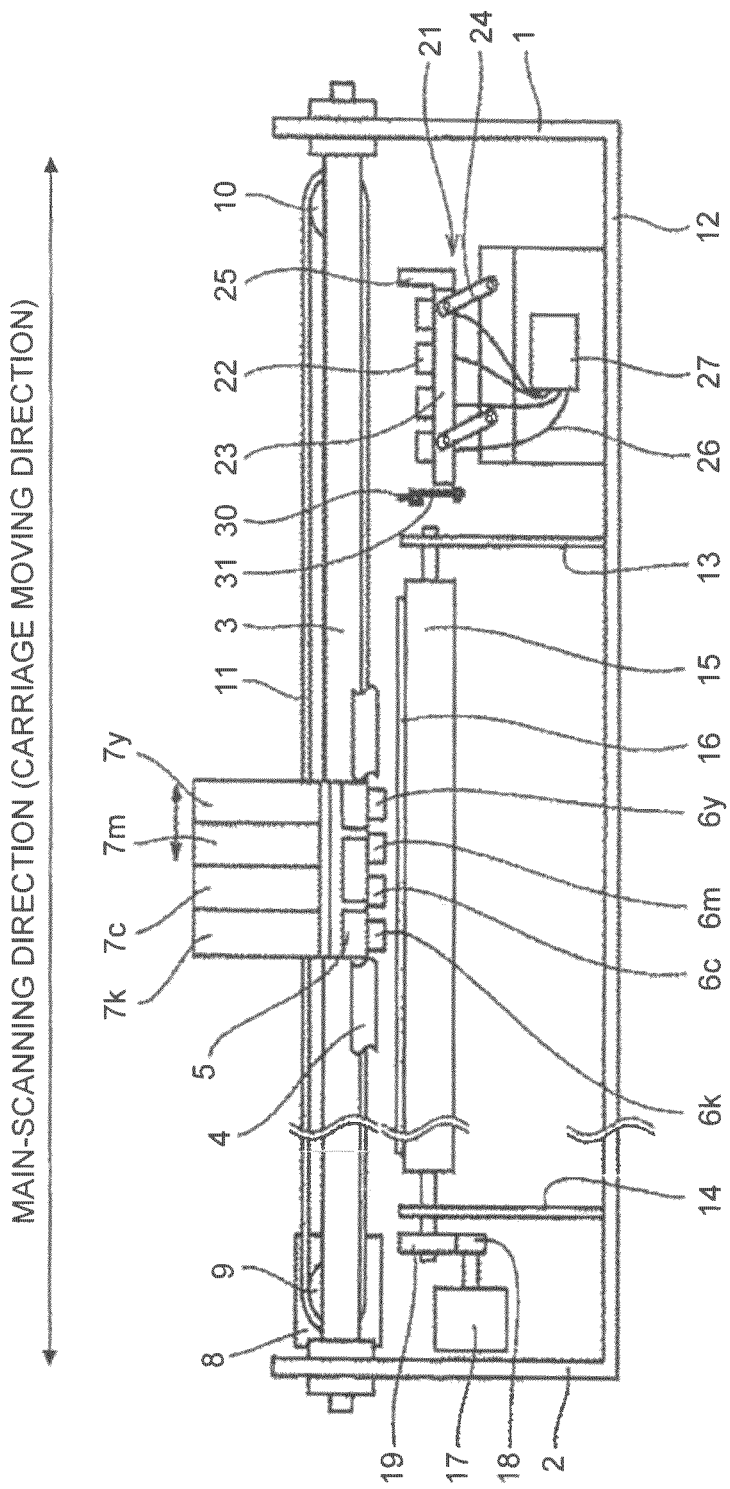
FIG. 1 is a diagram illustrating an exemplary schematic configuration of mechanism of a recording apparatus according to a first embodiment of the present invention.

Exemplary schematic configurations of mechanisms of the recording apparatus according to the first embodiment will be described first with reference to FIG. 1.

The recording apparatus according to the first embodiment includes side plates 1 and 2, which are provided on lateral ends of the recording apparatus, a main-supporting guide rod 3 and a sub-supporting guide rod 4 bridging the side plates 1 and 2 substantially horizontally, and the carriage 5 supported by the main-supporting guide rod 3 and the sub-supporting guide rod 4 slidably in the main-scanning direction.

On the carriage 5, a plurality of recording heads 6y, 6m, 6c, and 6k that eject yellow (Y) ink, magenta (M) ink, cyan (C) ink, and black (Bk) ink, respectively, are mounted with their ejection surfaces (nozzle surfaces) facing downward. On the carriage 5, a plurality of ink cartridges 7 (reference numeral "7" denotes any one or all of "7y, 7m, 7c, and 7k") are also mounted above the recording heads 6 (reference numeral "6" denotes any one or all of "6y, 6m, 6c, and 6k") in a replaceable manner. The ink cartridge 7 is an ink supplying element for supplying ink of each color to the corresponding recording head 6. The carriage 5 is configured to be fixed to a timing belt 11 extending between a driving pulley 9 and a driven pulley 10. A main-scanning motor 8 is driven in a controlled manner to drive the driving pulley 9, thereby to move the carriage 5 in the main-scanning direction. The movement of the carriage 5 in the main-scanning direction is, as illustrated in FIG. 2, controlled based on an encoder value obtained by an encoder sensor 41, provided on the carriage 5, in detecting a mark put on an encoder sheet 40.

The recording apparatus according to the first embodiment includes a bottom plate 12 connecting the side plates 1 and 2, sub-frames 13 and 14 provided upright on the bottom plate 12, and a conveying roller 15 rotatably supported by and between the sub-frames 13 and 14. The recording apparatus also includes a sub-scanning motor 17 arranged on a side where the sub-frame 14 is provided. The recording apparatus also includes a gear 18 fixed onto a rotary shaft of the sub-scanning motor 17 and a gear 19 fixed onto a shaft of the conveying roller 15 to transmit rotation of the sub-scanning motor 17 to the conveying roller 15.

A mechanism (hereinafter, "subsystem") 21 for maintaining and recovering reliability of the recording heads 6 is arranged between the side plate 1 and the sub-frame 13. The subsystem 21 includes a plurality of cap members 22, each of which caps the ejection surface of the corresponding recording head 6. The cap members 22 are held by a holder 23 that is swingably held by a link member 24. When the carriage 5 moves in the main-scanning direction and abuts on an engaging portion 25 provided on the holder 23, the holder 23 is lifted up, causing each of the cap members 22 to cap the ejection surface of the corresponding recording head 6. When the carriage 5 moves to an image forming area (on a recording medium 16), the holder 23 is lifted down, causing the cap members 22 to be separated from the ejection surfaces of the recording heads 6.

Meanwhile, the cap members 22 are connected to a suction pump 27 through suction tubes 26. The cap members 22 also have a vent opening to communicate with the atmospheric air through a vent tube and a vent valve. The suction pump 27 is configured to suck waste liquid (waste ink) and discharge the sucked waste liquid into a waste liquid tank.

A wiper blade 30 that wipes the ejection surfaces of the recording heads 6 is attached to a blade arm 31 on a side of the holder 23. The blade arm 31 is swingably shaft-supported to swing caused by rotation of a cam that is driven by a drive unit (not shown) to revolve.

Exemplary Configurations of Recording Mechanism and Detection Mechanism of Recording Apparatus Exemplary configurations of a recording mechanism and a detection mechanism of the recording apparatus according to the first embodiment will be below described with reference to FIGS. 2 and 3. FIG. 2 is a diagram for describing a top surface of the carriage 5. FIG. 3 is a diagram illustrating an exemplary arrangement of the recording heads 6.

The recording mechanism and the detection mechanism of the recording apparatus according to the first embodiment include the carriage 5, the encoder sheet 40, and a supporting plate 200. The carriage 5 includes the recording heads 6, the encoder sensor 41, and the image capturing unit 42.

The supporting plate 200 supports the recording medium 16 while ink is ejected from the recording heads onto the recording medium 16. The recording apparatus according to the first embodiment is a wide type that moves a relatively large distance for scanning in the main-scanning direction. Accordingly, the supporting plate 200 is formed by connecting, in the main-scanning direction (the direction in which the carriage 5 moves), a plurality of plate-like members.

Each of the recording heads 6 includes a plurality of nozzle arrays and ejects ink onto the recording medium 16 having been fed onto the supporting plate 200, thereby recording an image (dots) on the recording medium 16. The recording heads 6 of the first embodiment are configured, as illustrated in FIG. 3, to include recording heads on an upstream side and recording heads on a downstream side so as to secure a relatively large recording width in which the image (dots) can be recorded in one scanning operation on the recording medium 16. To increase a recording rate in black, the black recording heads $6k$ are arranged twice as many as the recording heads $6y$, $6m$, and $6c$ used for color printing. In addition, the recording heads $6y$ and $6m$ are arranged to be separated into a left-side part and a right-side part. This arrangement is employed so that the colors are superimposed in a same order irrespective of whether the carriage 5 moves forward or backward in the main-scanning direction, thereby eliminating a difference in colors formed during scanning between the colors formed in the forward movement and the colors formed in the backward movement. Note that the arrangement of the recording heads 6 illustrated in FIG. 3 is only an example and arrangement of the recording heads 6 is not limited thereto.

The recording mechanism according to the first embodiment moves the carriage 5, on which the recording heads 6 are mounted, in the main-scanning direction and causes ink to be ejected through the nozzle arrays of the recording heads 6 onto the recording medium 16 placed on the supporting plate 200, thereby recording the test pattern 100, which is the object, on the recording medium 16. The test pattern 100 is mainly used for color measurement of an image formed with the ink ejected from the recording heads 6.

The detection mechanism according to the first embodiment captures, using the image capturing unit 42, an image of the test pattern 100 recorded on the recording medium 16 and an image of the reference chart 400 (not shown) arranged in the image capturing unit 42. The detection mechanism compares colors of the image of the test pattern 100 captured by the image capturing unit 42 with colors of the image of the reference chart 400, thereby performing color measurement of the test pattern 100. The reference chart 400 is mainly used for color measurement of the test pattern 100.

Exemplary Configuration of Image Capturing Unit 42

An exemplary configuration of the image capturing unit 42 will be described below with reference to FIGS. 4A to 4C. FIGS. 4A to 4C are diagrams illustrating the exemplary configuration of the image capturing unit 42. FIG. 4A illustrates the exemplary configuration of a side surface of the image capturing unit 42. FIG. 4B illustrates a cross sectional view of the exemplary configuration of the image capturing unit 42 illustrated in FIG. 4A as viewed in the plane indicated by, and in the direction along, arrow "A" of FIG. 4A. FIG. 4C illustrates the exemplary configuration of the image capturing unit 42 as viewed along arrow "B" of FIG. 4A.

The image capturing unit 42 of the first embodiment includes the housing 421 having an aperture 428 on a image capturing surface side, a printed-circuit board 422, the two-dimensional sensor 423, a light source (light emitting diode (LED)) 424, the image capturing lens 425, the transparent member 426, and the reference chart 400. Reference numeral 427 denotes a cell of the image capturing lens 425.

The housing 421 is a hull of the image capturing unit 42, and has the aperture 428 on the side of the image capturing plane. As illustrated in FIG. 4B, inner wall of the housing 421 has a rectangular shape. The printed-circuit board 422 is provided for electrically connecting the two-dimensional sensor 423 and the light source 424 to a control unit (not shown). The two-dimensional sensor 423 captures an image of the reference chart 400 and an image of an object (the test pattern 100) simultaneously to obtain a two-dimensional captured image formed by the image of the reference chart 400 and the image of the test pattern 100. The light source 424 illuminates the reference chart 400 and the test pattern 100 with light. The image capturing lens 425 is a lens to form an image of an image capture object on the sensor surface of the two-dimensional sensor 423. The image capturing lens 425 is arranged such that an object surface is positioned on the reference chart 400. The transparent member 426 is a material which light can pass through.

In the image capturing unit 42 of the first embodiment, the reference chart 400 is arranged in a first area, which is approximately half the image capturing area, of the image capturing area of the two-dimensional sensor 423. The reference chart 400 is arranged in the housing 421 such that the image of the reference chart 400 is formed by the image capturing lens 425 on the sensor surface of the two-dimensional sensor 423.

The image of the test pattern 100, which is the object, is to be captured in a second area which is rest of the image capturing area other than the first area and in which the reference chart 400 is not arranged. Specifically, as illustrated in FIG. 4A, the test pattern 100 is arranged on the imaging plane of the image capturing unit 42. The transparent member 426 having refractive index n (n can be any desired number) is arranged on an optical path corresponding to the area in which the image of the test pattern 100 is to be captured. As illustrated in FIG. 4O, the transparent member 426 is configured to have an external form which is larger than the aperture 428 and arranged inside the housing 421. The position where the transparent member 426 is to be fixed is not specifically limited, and can be any position in the housing 421. For example, the transparent member 426 may be fixed to the image capturing plane side of the housing 421 or to an inner wall of the housing 421. When an image is formed with light having passed through the transparent member 426 of which the refractive index is n, the image may appear to be floating by an amount that depends on the value of n. Let C denote a floating amount of the image and Lp denote the length of the transparent member 426, then C can be obtained by the following equation, $$C = Lp(1-1/n),$$

where C denotes the floating amount of the image, Lp denotes the length of the transparent member 426, and n denotes the refractive index of the transparent member 426.

When an image capturing plane of the image capturing unit 42 other than an area occupied by the reference chart 400 is in a conjugate relation with the two-dimensional sensor 423, a distance L between the image capturing plane and a top portion of the image capturing lens 425 can be obtained from the following equation, $$L = Lc + Lp(1-1/n),$$

where L is the distance between the image capturing plane of the image capturing unit 42 and the top portion of the image capturing lens in the case when the image capturing plane and the two-dimensional sensor are in the conjugate relation with each other, Lc is the distance between the top portion of the image capturing lens and the reference chart 400 in a case when the reference chart 400 and the two-dimensional sensor 423 are in a conjugate relation with each other, and n is the refractive index of the transparent member 426.

If n, denoting the refractive index of the transparent member 426, is set as n=1.5, L=Lc+Lp(1/3) is obtained. In this case, by letting Lp be 9 (mm), L=Lc+3 (mm) is obtained. Thus, the position where the image of the reference chart 400 is to be formed and the position where the image of the test pattern 100 (image capturing plane) is to be formed can be made to be the sensor surface of the two-dimensional sensor 423. In other words, the test pattern 100 arranged on the image capturing plane away from the reference chart 400 by one third of Lp, which is the length of the transparent member 426, and the two-dimensional sensor 423 are made to be in the conjugated relation with each other.

As described above, in the image capturing unit 42 of the first embodiment, the transparent member 426 having the predetermined refractive index n is arranged on the second optical path between the two-dimensional sensor 423 and the test pattern 100. The transparent member 426 causes the position where the image of the reference pattern 400 is to be formed and the position where the image of the test pattern 100 is to be formed to be on the sensor surface of the two-dimensional sensor 423. That is, the image capturing lens 425 and the transparent member 426 cause both the image of the reference chart 400 and the image of the test pattern 100 to be formed on the sensor surface of the two-dimensional sensor 423.

Furthermore, the image capturing unit 42 of the first embodiment illuminates the reference chart 400 and the test pattern 100 with light from the light source 424 and captures the image of the reference chart 400 and the image of the test pattern 100 with the two-dimensional sensor 423 simultaneously in the same lighting condition.

Exemplary Configuration of Control Mechanism of Recording Apparatus

Figure 5:
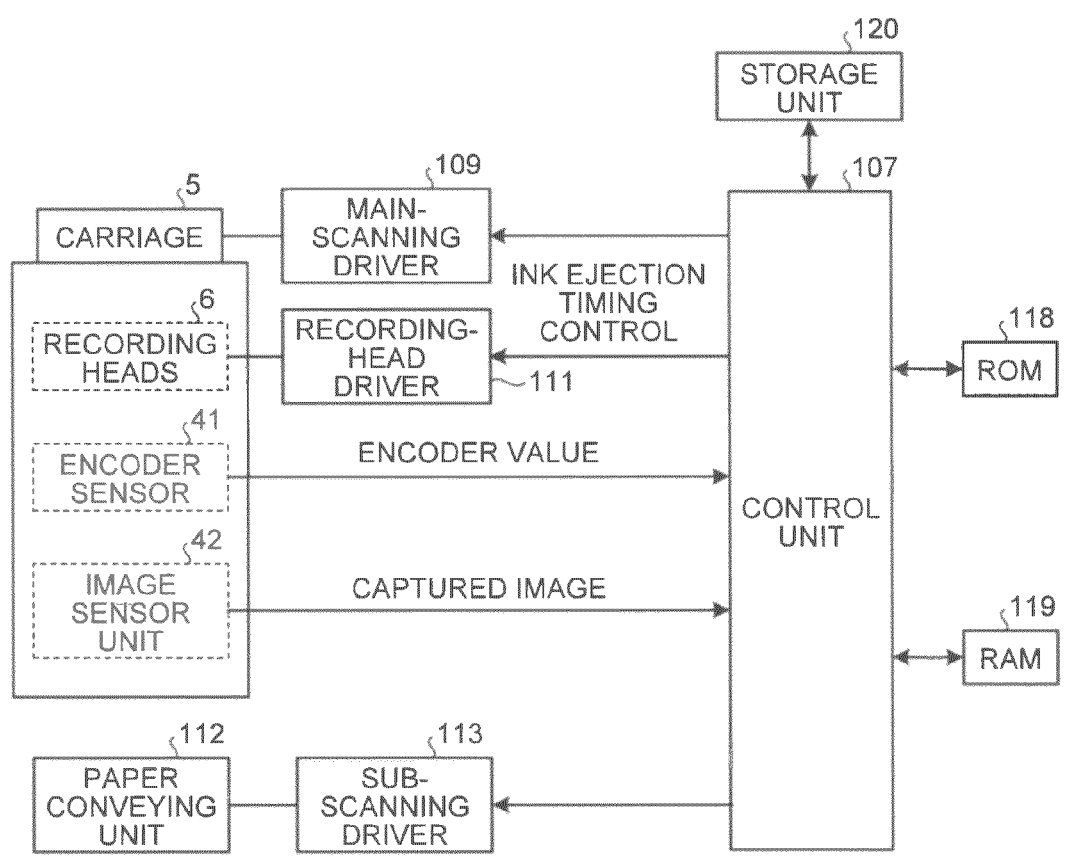
FIG. 5 is a diagram illustrating an exemplary schematic configuration of a control mechanism of the recording apparatus according to the first embodiment.

An exemplary configuration of a control mechanism of the recording apparatus according to the first embodiment will be described below with reference to FIG. 5.

The control mechanism of the recording apparatus according to the first embodiment includes a control unit 107, read-only memory (ROM) 118, random access memory (RAM) 119, a storage unit 120, the carriage 5, a main-scanning driver 109, the recording heads 6, a recording-head driver 111, the encoder sensor 41, the image capturing unit 42, a paper conveying unit 112, and a sub-scanning driver 113.

The control unit 107 supplies the storage unit 120 and each driver with recording data and a drive control signal (pulse signal) and manages control operations on whole of the recording apparatus. The control unit 107 controls driving of the carriage 5 in the main-scanning direction via the main-scanning driver 109. The control unit 107 also controls ink ejection timing of the recording heads 6 via the recording-head driver 111. The control unit 107 also controls driving of the paper conveying unit 112 (such as a conveying belt) in the sub-scanning direction via the sub-scanning driver 113.

The encoder sensor 41 outputs, to the control unit 107, the encoder value that is obtained by detecting the mark on the encoder sheet. Based on the encoder value, the control unit 107 controls driving of the carriage 5 in the main-scanning direction via the main-scanning driver 109.

The image capturing unit 42 captures the image of the reference chart 400 arranged in the image capturing unit 42 and the image of the test pattern 100 recorded on the recording medium 16 simultaneously and outputs, to the control unit 107, the captured image formed with the image of the reference chart 400 and the image of the test pattern 100. The control unit 107 compares colors of the reference chart 400 with colors of the test pattern 100 based on the captured image captured by the image capturing unit 42, thereby performing color measurement of the test pattern 100.

The ROM 118 stores necessary information. For example, the ROM 118 stores a computer program such as a procedure of a process to be performed by the control unit 107. The RAM 119 is used as a working memory and the like.

Exemplary Configuration of Reference Chart 400

An exemplary configuration of the reference chart 400 will be described below with reference to FIG. 6.

The reference chart 400 according to the first embodiment includes pattern rows for color measurement and pattern rows for geometrical-shape measurement.

The pattern rows for color measurement include CMYK primary-color gradation-pattern rows 401, RGB secondary-color gradation-pattern rows 402, a gray-scale gradation-pattern row 403, and tertiary-color gradation-pattern rows 404.

The pattern rows for geometrical-shape measurement include lines (outer line frame) 405 used for distance measurement and a circle pattern row 406 used for dot diameter measurement. Four corners 407 of the outer line frame 405 are markers for determining the position of the reference chart 400. The control unit 107 determines the four corners 407 of the outer line frame 405 from the captured image captured by the image capturing unit 42, thereby determining the position of the reference chart 400.

Lab values of each of patches belonging to each of the pattern rows 401, 402, 403, 404, and 406 are measured in advance, and are used as reference values in color measurement of the test pattern 100. Configurations of the pattern rows 401, 402, 403, 404, and 406 are not specifically limited; any appropriate pattern row can be applied to each of the pattern rows 401, 402, 403, 404, and 406. For example, it is possible to use a patch that maximizes a range of colors to be determined, while a configuration in which a patch is interchangeable depending on the purpose of use. The CMYK primary-color gradation-pattern rows 401 and the gray-scale gradation-pattern row 403 can be formed with color measurement values of ink for use by the recording apparatus. The RGB secondary-color gradation-pattern rows 402 can be formed with color measurement values of colors that can be reproduced with the ink for use by the recording apparatus. Alternatively, a reference chart, such as the Japan Color, that defines standard color measurement values can be used.

Exemplary Method for Color Measurement of Test Pattern 100

An exemplary method for color measurement of the test pattern 100 will be described below with reference to FIG. 7.

Figure 6:
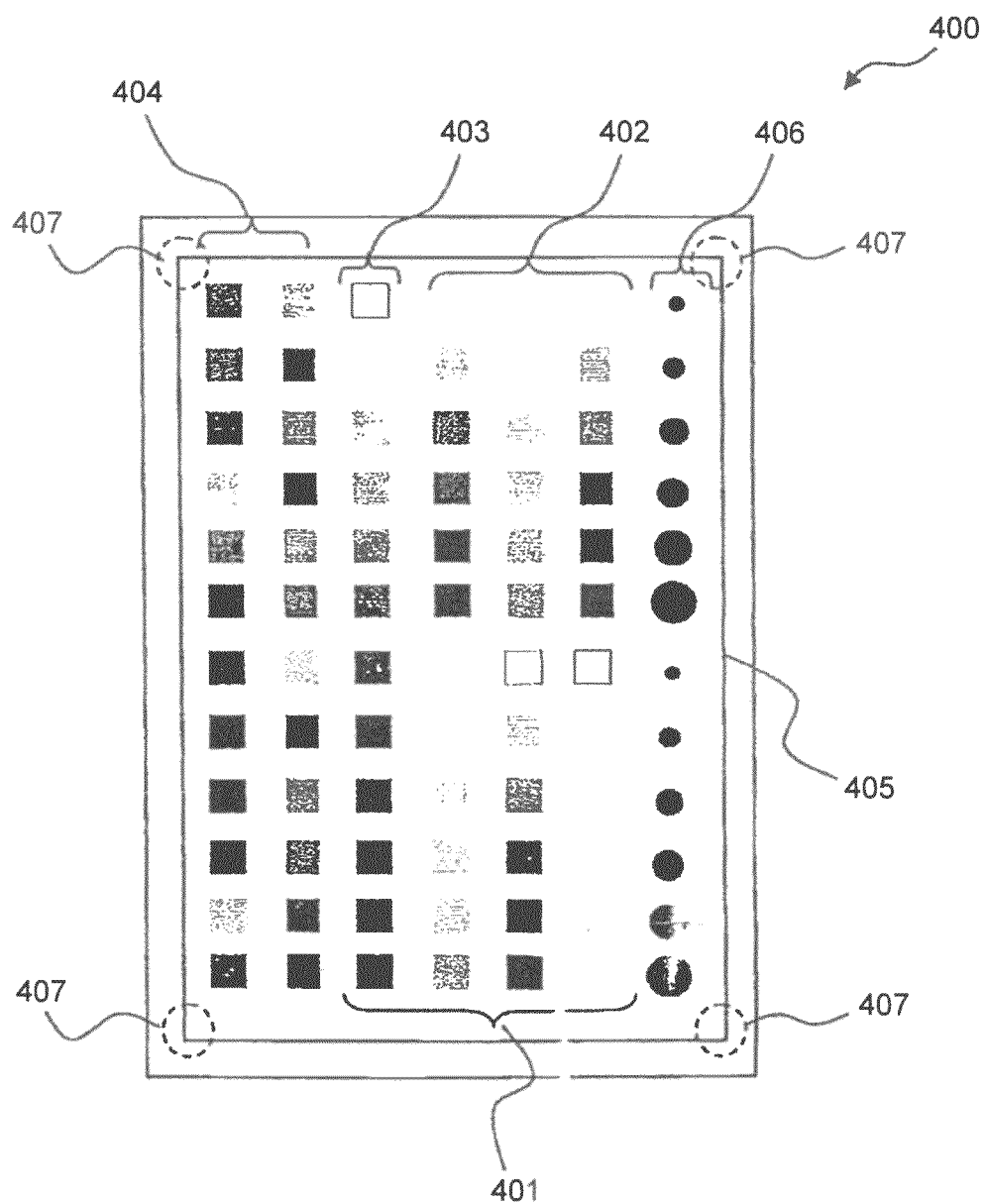
FIG. 6 is a diagram illustrating an exemplary configuration of a reference chart.
Figure 7:
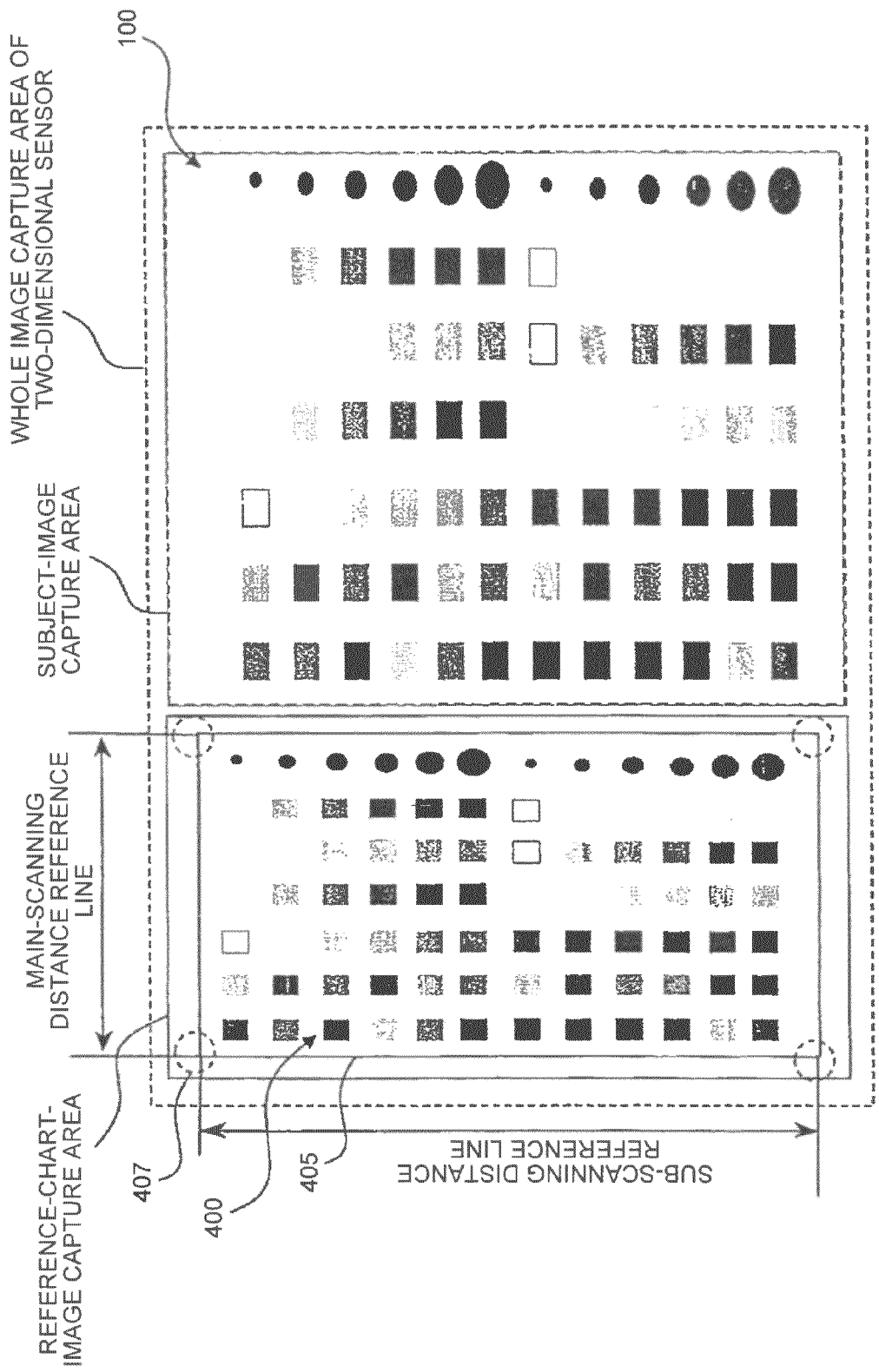
FIG. 7 is a schematic diagram for explaining an exemplary method for color measurement of a test pattern.

To perform color measurement of the test pattern 100, the test pattern 100 configured as illustrated in FIG. 7 is recorded on the recording medium 16. The image capturing unit 42 captures the image of the reference chart 400 and the image of the test pattern 100 simultaneously, thereby obtaining the captured image illustrated in FIG. 7. Of the whole image capturing area of the two-dimensional sensor 423 (whole image capturing area of the two-dimensional sensor) illustrated in FIG. 7, a left half area configures a reference-chart-image capturing area where the image of the reference chart 400 illustrated in FIG. 6 is to be captured. The Lab values of each of the patches belonging to the reference chart 400 are measured and held in advance. A right half area of the image capturing area configures an object-image capturing area where the image of the test pattern 100 illustrated in FIG. 7 is to be captured. Meanwhile, it is preferable that the test pattern 100 is formed with a large number of colors to obtain a color profile; however, depending on a purpose, the test pattern 100 can be formed with a small number of colors.

When the captured image illustrated in FIG. 7 has been obtained, first, positions of the four corners 407 of the outer line frame (the main-scanning distance reference line and the sub-scanning distance reference line) 405 of the reference chart 400 are determined by pattern matching or the like. As a result, the position of the reference chart 400 is determined. After the position of the reference chart 400 is determined, position of each of the patches belonging to the reference chart 400 is determined.

Subsequently, RGB values of each patch belonging to the reference chart 400 are retrieved to perform calibration of sensitivity of an image sensor. More specifically, RGB values of each of achromatic (white, black, and gray-scale) patches among the patches belonging to the reference chart 400 are retrieved.

Figure 8:
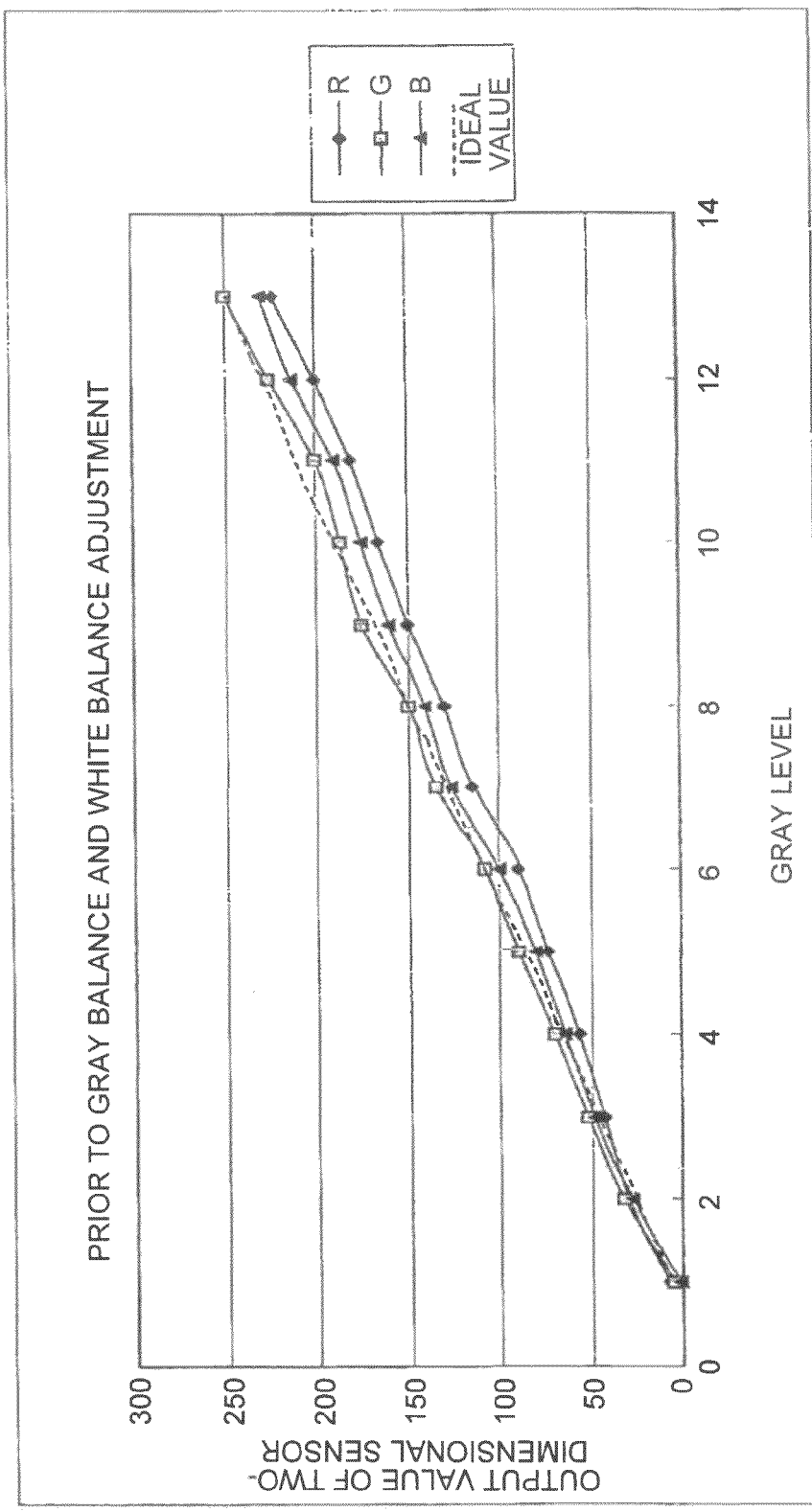
FIG. 8 is a graph in which both RGB output values prior to gray balance adjustment and white balance adjustment and ideal RGB output values are plotted.
Figure 9:
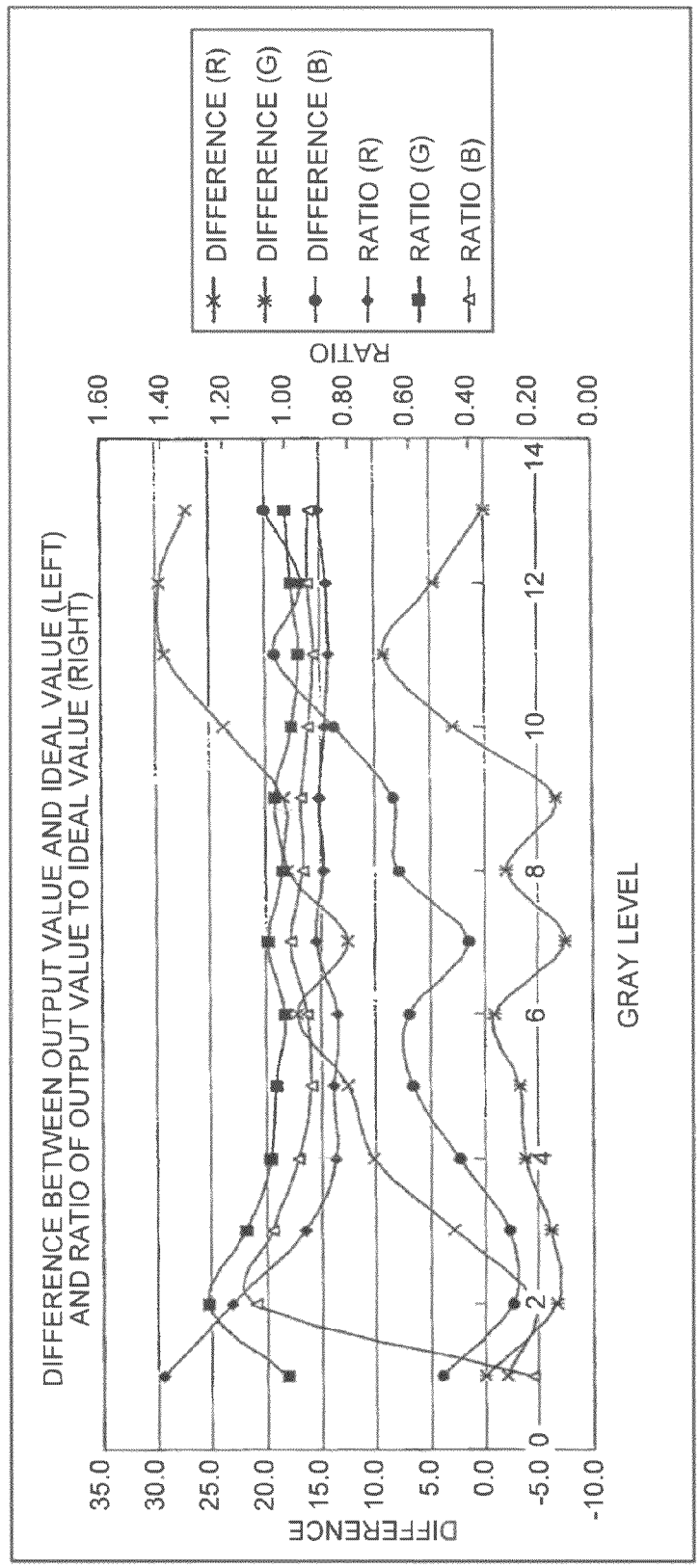
FIG. 9 is a graph in which differences between actual RGB output values and the ideal RGB output values and ratios of the actual RGB output values to the ideal RGB output values are plotted.

FIG. 8 is a graph plotting RGB output values prior to gray balance adjustment and white balance adjustment. If the RGB values obtained from the captured image illustrated in FIG. 7 are output without performing the balance adjustment, the RGB output values as seen in FIG. 8 are obtained and are output as colors out of color balance and having color saturation. This results from an error caused by variation in sensitivity of the two-dimensional sensor 423. Ideally, all the RGB output values are to be output as values having linearity seen in a broken line plotted in FIG. 8. Therefore, the recording apparatus according to the first embodiment calculates differences between the actual RGB output values (solid lines) obtained from the captured image illustrated in FIG. 7 and the ideal RGB output values (broken line) or ratios of the actual RGB output values to the ideal RGB output values, and temporarily stores the differences or the ratios in the storage unit 120. FIG. 9 is a graph plotting the differences between the actual RGB output values (solid lines) and the ideal RGB output values (broken line) and the ratios of the actual RGB output values to the ideal RGB output values. The recording apparatus according to the first embodiment is capable of obtaining RGB output values having linearity by correcting the actual RGB output values by using the differences or the ratios that are stored in the storage unit 120 and plotted in FIG. 9.

Meanwhile, values between the actual RGB output values plotted in FIG. 8 are desirably processed by appropriate interpolation, such as spline interpolation or polynomial interpolation. Differences or ratios obtained by using the RGB output values, which are obtained by interpolating the actual RGB output values plotted in FIG. 8, and the ideal RGB output values are temporarily stored in the storage unit 120. By correcting the actual RGB output values by using the differences or the ratios, RGB output values having a better linearity property can be obtained.

Figure 10:
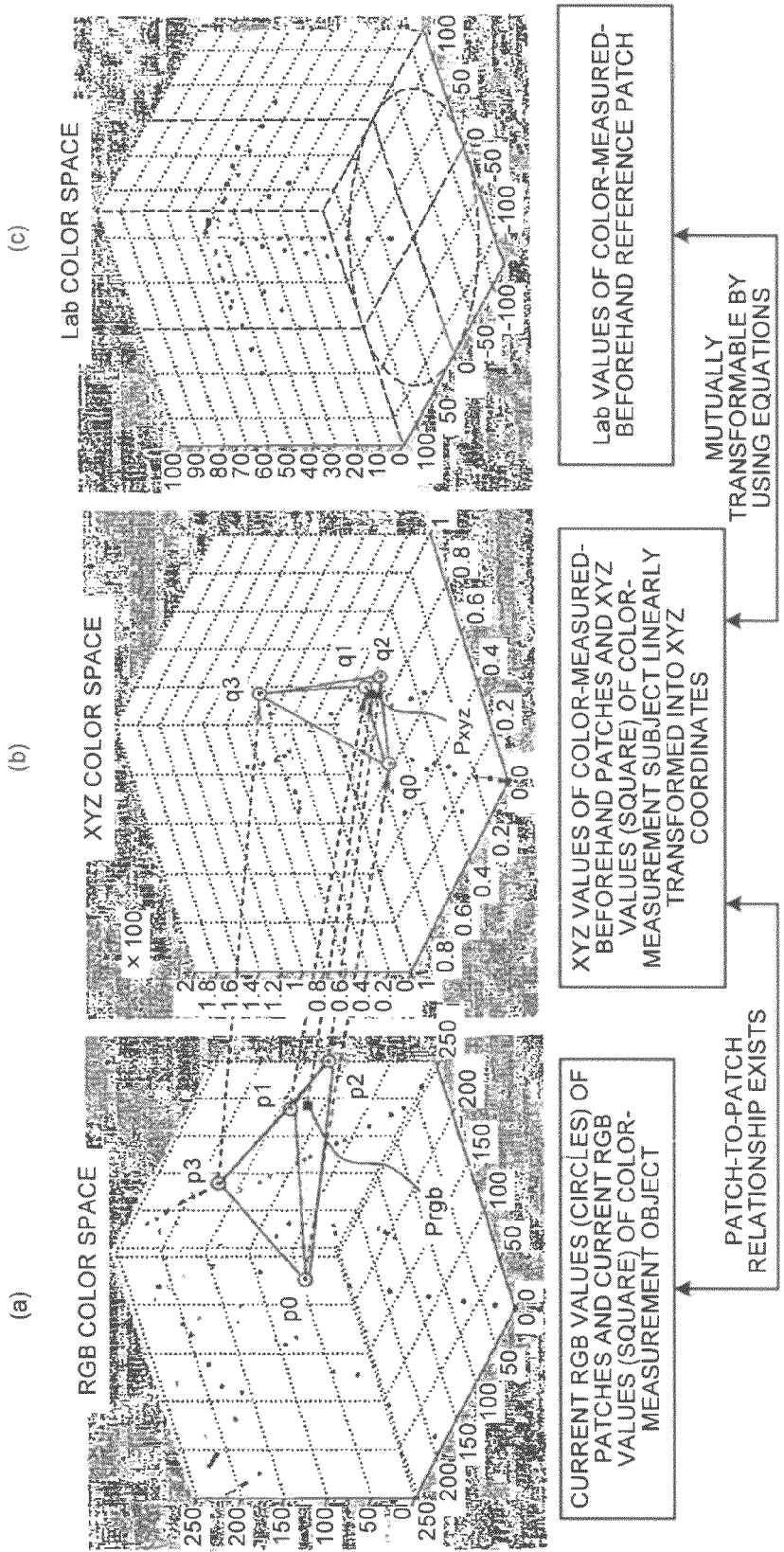
FIG. 10 is a schematic diagram for explaining the exemplary method for color measurement of the test pattern.

An exemplary method for obtaining Lab values from the RGB values obtained from the test pattern 100 will be described with reference to FIGS. 10 to 12.

FIG. 10(c) is a plot of Lab values (previously measured values) of each of the patches belonging to the primary-color gradation-pattern rows 401 (CMYK) and the patches belonging to the secondary-color gradation-pattern rows 402 (RGB) of the reference chart 400 illustrated in FIG. 6 onto the Lab color space.

FIG. 10(a) is a plot of RGB values obtained by sensing each of the patches belonging to the primary-color gradation-pattern rows 401 (CMYK) and the patches belonging to the secondary-color gradation-pattern rows 402 (RGB) of the reference chart 400 illustrated in FIG. 6 with the two-dimensional sensor 423 onto the RGB color space.

FIG. 10(b) is a plot of XYZ values obtained by converting the Lab values of FIG. 10(c) by using predetermined equations (Lab⇒XYZ) onto the XYZ color space. Lab values can be converted into XYZ values by using the equations of FIG. 11A (Lab⇒XYZ). XYZ values can be converted into Lab values by using the equations in FIG. 11B (XYZ⇒Lab). Accordingly, the Lab values of FIG. 10(c) and the XYZ values of FIG. 10(b) are mutually convertible by using the conversion equations displayed in FIGS. 11A and 11B.

Suppose that RGB values of one patch in the test pattern 100 of the object obtained from the object-image capturing area illustrated in FIG. 7 are at a Prgb point in the RGB color space illustrated in FIG. 10(a). In this case, four nearest neighbor points capable of forming a tetrahedron that includes the Prgb point indicated in FIG. 10(a) inside are searched (step S1). In the illustrated example in FIG. 10(a), p0, p1, p2, and p3 are selected. Let the three-dimensional coordinates of the four points (p0, p1, p2, and p3) in the RGB color space illustrated in FIG. 10(a) be p0 (x01, x02, x03), p1 (x1, x2, x3), p2 (x4, x5, x6), and p3 (x7, x8, x9).

Subsequently, four points (q0, q1, q2, and q3) in the XYZ color space illustrated in FIG. 10(b) corresponding to the four points (p0, p1, p2, and p3) in the RGB color space illustrated in FIG. 10(a) are searched (step S2). Let the three-dimensional coordinates of the four points (q0, q1, q2, and q3) in the XYZ color space be q0 (y01, y02, y03), q1 (y1, y2, y3), q2 (y4, y5, y6), and q3 (y7, y8, y9).

Subsequently, a linear transformation matrix for linearly converting the local space in the tetrahedron is calculated (step S3). More specifically, a pair of mutually corresponding points is determined by selecting one point from among the four points (p0, p1, p2, and p3) and another point from among the four points (q0, q1, q2, and q3) (in the first embodiment, a pair of points p0 and q0, which is the pair closest to achromatic color, is selected). The corresponding point pair (p0, q0) is set as an origin (the coordinates of p1 to p3 and those of q1 to q3 are values relative to p0 and q0, respectively).

Here, it is assumed that conversion equation from the RGB color space illustrated in FIG. 10(a) onto the XYZ color space illustrated in FIG. 10(b) can be represented by a linear transformation equation, $Y=AX$, where X denotes three-dimensional coordinates of a point in the RGB color space illustrated in FIG. 10(a), and Y denotes three-dimensional coordinates of a point in the XYZ color space illustrated in FIG. 10(b).

Next, mapping of the RGB values (Prgb) obtained by the two-dimensional sensor 423, as illustrated in FIG. 10(a), to a point in the XYZ color space illustrated in FIG. 10(b) is performed by using the linear transformation matrix ($Y=AX$) (step S4). Pxyz values in the XYZ color space illustrated in FIG. 10(b) are thus obtained.

Subsequently, the Pxyz values obtained by the mapping to the XYZ color space illustrated in FIG. 10(b) are converted into Lab values by using a general XYZ⇒Lab conversion, thereby obtaining Lab values corresponding to the RGB values illustrated in FIG. 10(a) (step S5). Conversion from the XYZ values to the Lab values can be performed by using the equations in FIG. 11B.

Thus, even when the sensitivity of the two-dimensional sensor 423 has changed or even when a wavelength or intensity of light from the light source 424 has changed, color measurement can be performed with high accuracy by capturing the image of the reference chart 400 and the image of the test pattern 100 simultaneously and performing color measurement of the test pattern 100 by keeping comparison with the reference chart 400.

The recording apparatus according to the first embodiment compares the Lab values of the test pattern 100 measured by using the image capturing unit 42 with ideal Lab values that are desired to be recorded on the recording medium 16, and corrects the amounts of ink to be ejected from the recording heads 6 or even image data based on the differences between the Lab values. Accordingly, the recording apparatus can form an image with the ink ejected from the recording heads 6 in colors closer to the ideal colors that are desired to be recorded on the recording medium 16. Meanwhile, in the first embodiment, the test pattern 100 is the object. However, there can be cases where color measurement of a recorded image other than the image of the test pattern 100 is performed for test printing or the like. In such a case, a recorded image becomes an object.

Meanwhile, an image to be formed on the recording medium 16 is generally formed using a dot matrix. Desired colors are reproduced by superimposing ink of CMYK and the like. However, misalignment of the ink occurs in an image may cause to degrade the image and also to change the color measurement values obtained by using the test pattern 100 described above.

When colors of an image formed on the recording medium 16 is changed due to misalignment of the image, an attempt to correct colors of an image to be formed on the recording medium 16 may cause ejected amounts of ink to be out of balance, thereby to unable to obtain a good quality image. Accordingly, it is desirable to correct misalignment of an image before color measurement of the test pattern 100 is performed. A method for correcting image misalignment will be described below.

Exemplary Method for Correcting Image Misalignment

An exemplary method for correcting image misalignment will be described below with reference to FIG. 13.

Figure 13:
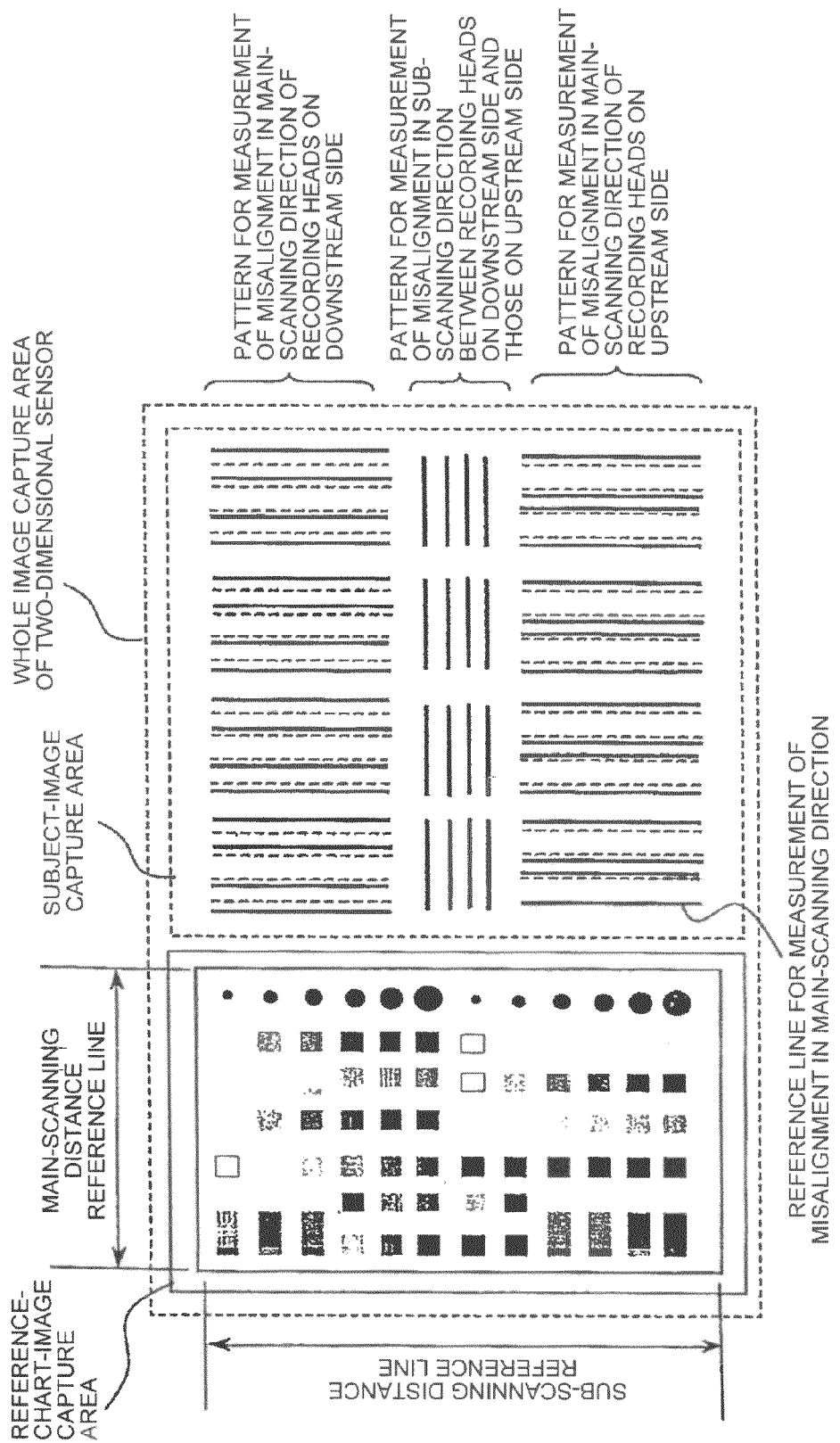
FIG. 13 is a first diagram for explaining compensation for misalignment of an image.

When image misalignment is corrected, the test pattern 100 illustrated in FIG. 13 is recorded on the recording medium 16, and the image capturing unit 42 captures an image of the reference chart 400 and an image of the test pattern 100 simultaneously, thereby to obtain a captured image illustrated in FIG. 13.

Of the whole image capturing area of the two-dimensional sensor 423 (whole image capturing area of the two-dimensional sensor) illustrated in FIG. 13, the left half area configures the reference-chart-image capturing area where the image of the reference chart 400 illustrated in FIG. 6 is to be captured. The right half area of the image capturing area configures the object-image capturing area where the image of the test pattern 100 illustrated in FIG. 13 is to be captured.

Vertical lines (solid lines) in a lower half area of the object-image capturing area of the test pattern 100 illustrated in FIG. 13 form a pattern used for measuring relative misalignment of the recording heads 6 on the upstream side in the main-scanning direction. Vertical lines (solid lines) in an upper half area of the object-image capturing area of the test pattern 100 form a pattern used for measuring relative misalignment of the recording heads 6 on the downstream side in the main-scanning direction. Horizontal lines (solid lines) in a middle area of the object-image capturing area of the test pattern 100 form a pattern used for measuring relative misalignment between the recording heads 6 on the upstream side and the recording heads 6 on the downstream side in the sub-scanning direction. Note that broken vertical lines depicted in FIG. 13 indicate positions of ideal vertical lines that are to be recorded on the recording medium 16 in the absence of misalignment in the main-scanning direction and that are not actually recorded on the recording medium 16.

To measure the relative misalignment of the recording heads 6 on the upstream side in the main-scanning direction, first, intervals between vertical lines that are actually recorded on the recording medium 16 by shifting the recording heads 6 by a predetermined interval a are measured. Differences between positions of the actually-recorded vertical lines (solid lines) on the recording medium 16 and positions of the ideal vertical lines (broken lines) that are to be recorded on the recording medium 16 when there is no misalignment in the main-scanning direction are calculated as misalignment amounts in the main-scanning direction. The intervals between the vertical lines (solid lines) actually recorded on the recording medium 16 are measured with reference to a black vertical line recorded at a leftmost position as a reference line for measurement of misalignment in the main-scanning direction.

More specifically, as illustrated in FIG. 14, the first black vertical line recorded at the leftmost position is used as the reference line for measurement of misalignment in the main-scanning direction. Intervals (x1, x2, and x3) between the reference line and the actually-recorded vertical lines are measured. The positions of the actual vertical lines can thus be determined. Subsequently, differences ($\Delta x1$, $\Delta x2$, and $\Delta x3$) between the positions of the actually-recorded vertical lines (solid lines) and the positions of the ideal vertical lines (broken lines) are measured. The difference ($\Delta x1$) between the position of the second actually-recorded vertical line and the position of the corresponding ideal vertical line can be obtained by the subtraction $\Delta x1 = x1 - \alpha$. The difference ($\Delta x2$) between the position of the third actually-recorded vertical line and the position of the corresponding ideal vertical line can be obtained by the subtraction $\Delta x2 = x2 - 2\alpha$. The difference ($\Delta x3$) between the position of the fourth actually-recorded vertical line and the position of the corresponding ideal vertical line can be obtained from $\Delta x3 = x3 - 3\alpha$. The misalignment in the main-scanning direction is corrected based on the differences ($\Delta x1$, $\Delta x2$, and $\Delta x3$) so that the positions of the actually-recorded vertical lines (solid lines) on the recording medium 16 coincide with the positions of the ideal vertical lines (broken lines).

The relative misalignment of the recording heads 6 on the downstream side in the main-scanning direction is to be measured with the method described above with reference to FIG. 14. Note that the position of the first black vertical line recorded at the leftmost position can deviate from the position of the reference line for measurement of misalignment in the main-scanning direction as illustrated in FIG. 15. Therefore, a difference ($\Delta x0$) between the first black vertical line recorded at the leftmost position and the reference line for measurement of the misalignment in the main-scanning direction is calculated, and the position of the first black vertical line recorded at the leftmost position is corrected by using the difference ($\Delta x0$) to the position (ideal position) of the reference line for measurement of the misalignment in the main-scanning direction. Thereafter, relative misalignment of the recording heads 6 on the downstream side in the main-scanning direction is measured by using the method illustrated in FIG. 14, thereby correcting the misalignment in the main-scanning direction.

Figure 16:
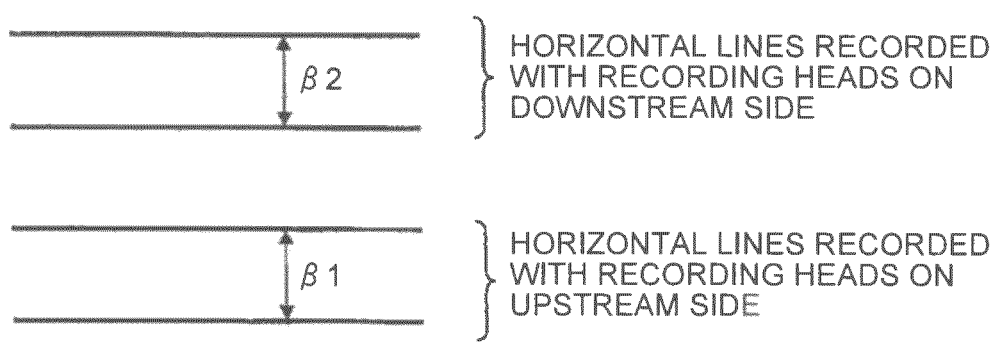
FIG. 16 is a fourth diagram for explaining the compensation for misalignment of an image.

To measure the misalignment between the recording heads 6 on the upstream side and the recording heads 6 on the downstream side in the sub-scanning direction, two horizontal lines, which are on the lower side, of the four horizontal lines illustrated in FIG. 13 are recorded on the recording medium 16 by using the recording heads 6 on the upstream side. Similarly, two horizontal lines on the upper side are recorded on the recording medium 16 by using the recording heads 6 on the downstream side. As illustrated in FIG. 16, a distance ($\beta 1$) between the horizontal lines on the lower side and a distance ($\beta 2$) between the horizontal lines on the upper side are measured. A difference ($\Delta \beta = \beta 1 - \beta 2$) is calculated as a misalignment amount between the recording heads 6 on the upstream side and the recording heads 6 on the downstream side in the sub-scanning direction. Based on the difference ($\Delta \beta$), the misalignment in the sub-scanning direction between the recording heads 6 on the upstream side and the recording heads 6 on the downstream side in the sub-scanning direction is corrected, thereby performing correction to make the distance ($\beta 1$) between the horizontal lines on the lower side to be equal to the distance ($\beta 2$) between the horizontal lines on the upper side.

Meanwhile, the distance between the sub-scanning distance reference line and the main-scanning distance reference line of the reference chart 400 is an absolute distance. The absolute distance between the sub-scanning distance reference line and the main-scanning distance reference line is managed by the storage unit 120 in advance. An image-capturing distance between the sub-scanning distance reference line and the main-scanning distance reference line illustrated in FIG. 13 obtained by capturing the image of the reference chart 400 is compared with the absolute distances between the sub-scanning distance reference line and the main-scanning distance reference line managed by the storage unit 120. Relative ratio of the image-capturing distances to the absolute distance is calculated. By multiplying the relative ratio to misalignment amounts obtained from the test pattern 100 in the object-image capturing area, actual misalignment amounts can be calculated. By correcting the misalignment based on the actual misalignment amounts, misalignment can be corrected with high accuracy.

The control unit 107 performs calculation of the misalignment amounts described above based on the captured image illustrated in FIG. 13 captured by the image capturing unit 42. The control unit 107 corrects a position of an image to be formed with ink ejected from the recording heads 6 by controlling ink ejection timing from the recording heads 6 and/or controlling a conveyance amount of the recording medium 16. This corrects misalignment of the image, causing color measurement of the test pattern 100 to be performed accurately.

In the exemplary method for correcting misalignment of an image described above, the test pattern 100 is formed with the line patterns illustrated in FIG. 13. Alternatively, the test pattern 100 can be formed with a dotted pattern as that illustrated in FIG. 17 to correct geometric misalignment of the recording heads 6.

Figure 17:
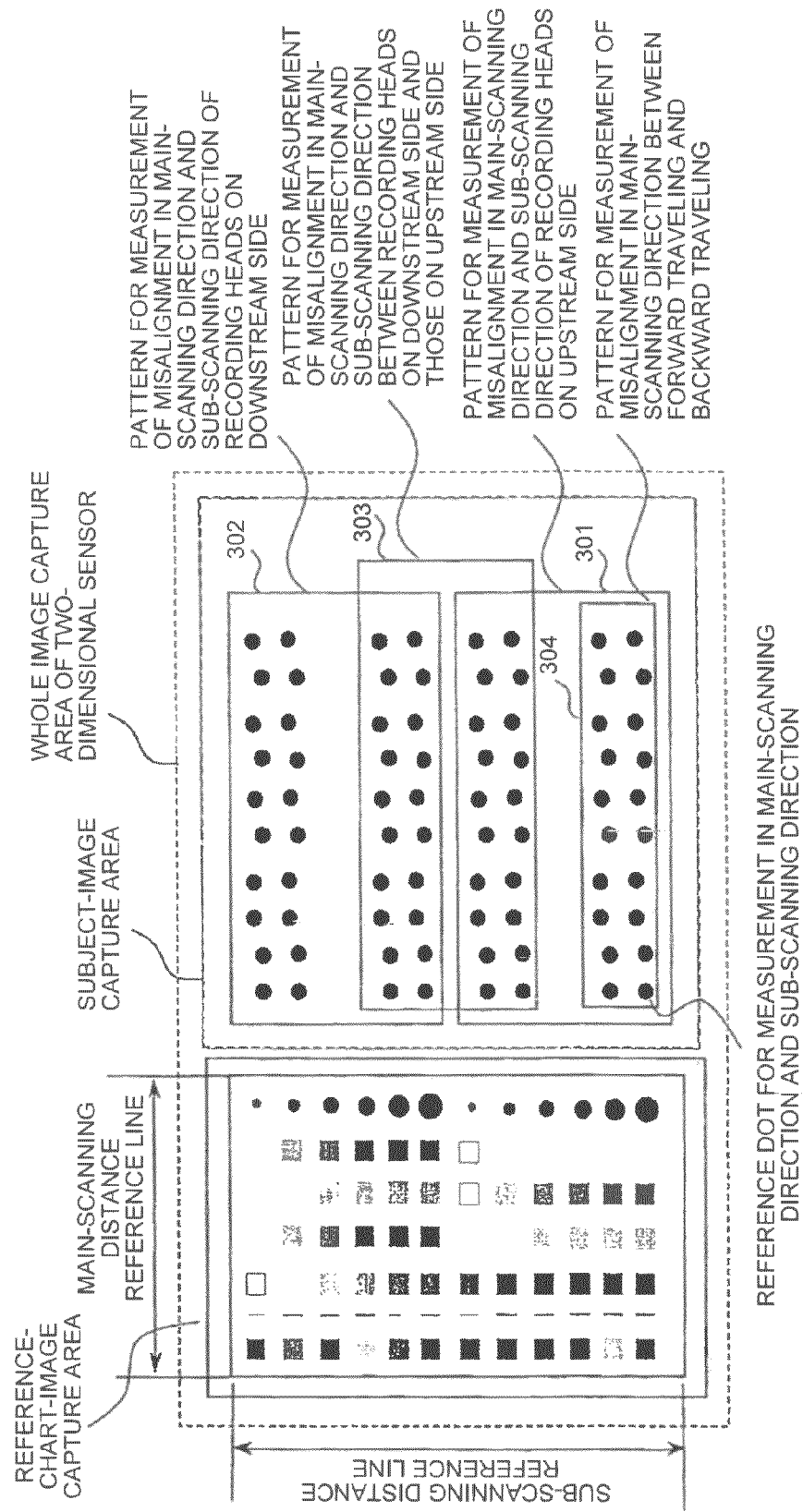
FIG. 17 is a diagram illustrating a modification of the compensation for misalignment of an image.

In the case of the test pattern 100 illustrated in FIG. 17, a misalignment amount in the main-scanning direction and that in the sub-scanning direction of the recording heads 6 on the upstream side are to be measured by using dots in a first frame 301. A misalignment amount in the main-scanning direction and that in the sub-scanning direction of the recording heads 6 on the downstream side are to be measured by using dots in a second frame 302. A misalignment amount in the main-scanning direction and that in the sub-scanning direction between the recording heads 6 on the upstream side and the recording heads 6 on the downstream side are to be measured by using dots in a third frame 303. A misalignment amount in the main-scanning direction and that in the sub-scanning direction caused by reciprocation of the recording heads 6 are to be measured by using dots in a fourth frame 304.

As described above, the recording apparatus according to the first embodiment records the test pattern 100, which is the object, on the recording medium 16. The image capturing unit 42 captures the image of the test pattern 100, which is the object, and the image of the reference chart 400 arranged in the image capturing unit 42 simultaneously. At this time, the image capturing lens 425 and the transparent member 426 cause both the image of the reference chart 400 and the image of the test pattern 100 to be formed on the sensor surface of the two-dimensional sensor 423. Color measurement of the test pattern 100 is performed by comparing colors of the reference chart 400 with colors of the test pattern 100 based on the captured image captured by the image capturing unit 42. Accordingly, the image capturing unit 42 can be used even in a case where the image capturing unit 42 is to be moved. Furthermore, the image capturing unit 42 is relatively inexpensive and also capable of increasing accuracy in color measurement of the test pattern 100.

Second Embodiment

A second embodiment of the present invention will be described below. In the first embodiment, the image capturing unit 42 illustrated in FIGS. 4A to 4C causes the reference chart 400 and the test pattern 100 to be directly illuminated with the light from the light source 424 to capture the image of the reference chart 400 and the image of the test pattern 100.

However, in the configuration where the light from the light source 424 directly illuminates the reference chart 400 and the test pattern 100, because the distance from the light source 424 to the reference chart 400 and the distance from the light source 424 to the test pattern 100 differ from each other, illuminance on the surface of the reference chart 400 can be different from illuminance on the test pattern 100. In a condition where the illuminance on the surface of the reference chart 400 is different from the illuminance on the test pattern 100, accuracy in color measurement of the test pattern 100 undesirably decreases.

Figure 18A:
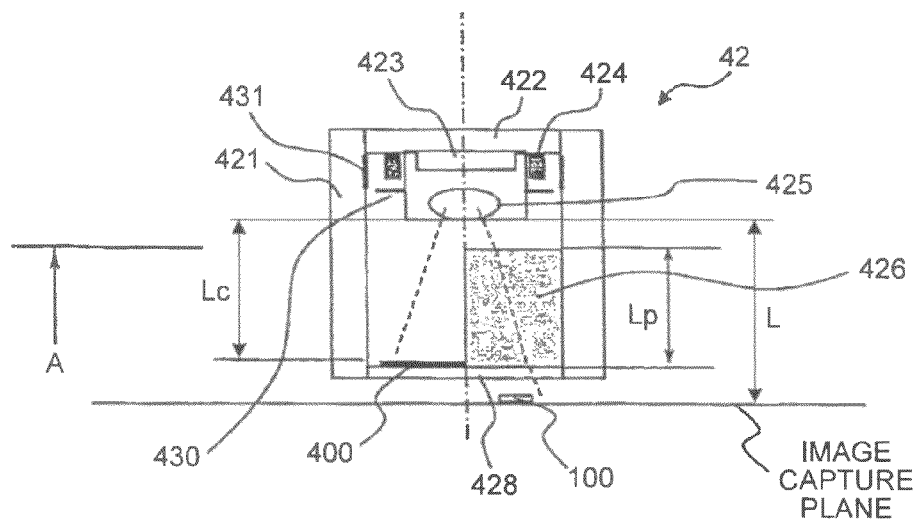
FIGS. 18A and 18B are diagrams illustrating a first exemplary configuration of an image capturing unit according to a second embodiment of the present invention.
Figure 18B:
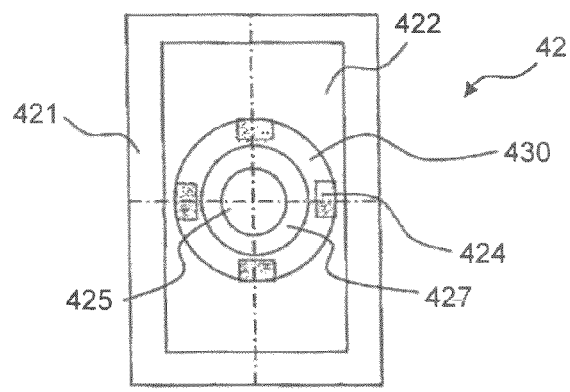

For this reason, in the second embodiment, as illustrated in FIGS. 18A and 18B, a diffuse light-shielding plate 430 is arranged in the housing 421 so that the light from the light source 424 does not directly illuminate any one of the reference chart 400 and the test pattern 100. Furthermore, a white diffusing surface 431 is arranged on an inner surface of the housing 421 so that the light from the light source 424 indirectly illuminates the reference chart 400 and the test pattern 100. This makes the illuminance on the surface of the reference chart 400 and that on the test pattern 100 to be more uniform than that of the first embodiment. As a result, accuracy in color measurement of the test pattern 100 can be increased than that of the first embodiment.

Figure 19:
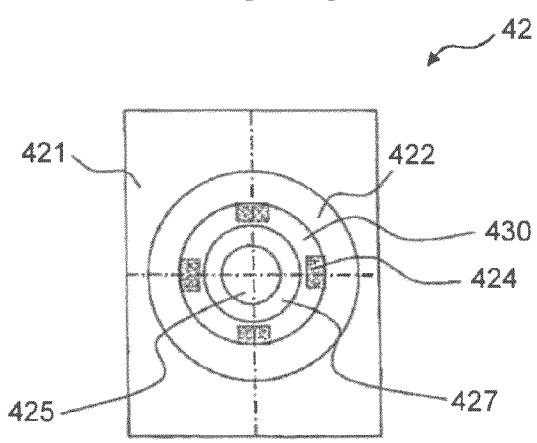
FIG. 19 is a diagram illustrating a second exemplary configuration of the image capturing unit according to the second embodiment.

As illustrated in FIG. 18B, the housing 421 illustrated in FIGS. 18A and 18B has a rectangular inner surface. However, it is desirable that the housing 421 has a circular inner surface as illustrated in FIG. 19. If the housing 421 has the circular inner surface as illustrated in FIG. 19, the distances, across which light emitted from the light source 424 travels to reach the inner surface of the housing 421, can be made uniform. As a result, the difference between the illuminance on the surface of the reference chart 400 and that on the test pattern 100 can be further reduced.

As described above, the recording apparatus according to the second embodiment includes the diffuse light-shielding plate 430 that prevents the light from the light source 424 from directly illuminating the reference chart 400 and the test pattern 100. The recording apparatus also includes the white diffusing surface 431 on the inner surface of the housing 421 that diffuses the light from the light source 424 to cause the light diffused by the white diffusing surface 431 to illuminate the reference chart 400 and the test pattern 100. Furthermore, the housing 421 has the circular inner surface. This makes the illuminance on the surface of the reference chart 400 and the illuminance on the surface of the test pattern 100 to be uniform. Accordingly, accuracy in color measurement of the test pattern 100 can be further increased.

Third Embodiment

An outline of a recording apparatus according to a third embodiment of the present invention will be described with reference to FIGS. 20 and 21.

Figure 20:
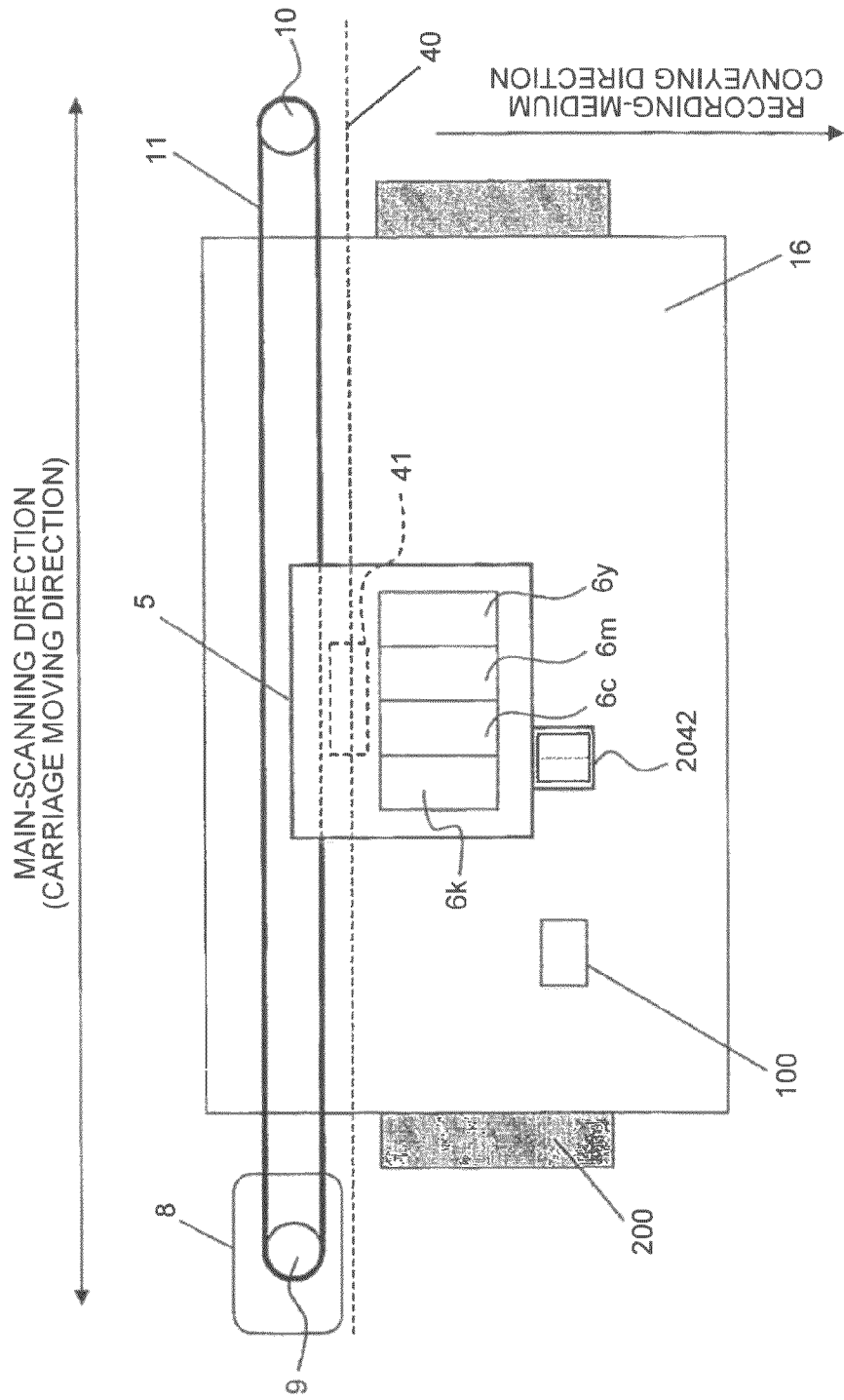
FIG. 20 is a diagram illustrating an exemplary schematic configuration of a recording mechanism and a detection mechanism of a recording apparatus according to a third embodiment of the present invention.

As illustrated in FIG. 20, the recording apparatus according to the third embodiment includes an image capturing unit 2042 (image capturing device) mounted on the carriage 5. As illustrated in FIG. 21, the image capturing unit 2042 is configured to include a housing 2421; a reference pattern (corresponding to the reference chart 400) used for color measurement and arranged in the housing 2421; a two-dimensional sensor 2423 that captures an image of the reference pattern 400 in one part of an image capturing area and captures an image of the test pattern 100, which is an object, in another part of the image capturing area; an image capturing lens 2425 arranged on a first optical path between the two-dimensional sensor 2423 and the reference pattern 400 and a second optical path between the two-dimensional sensor 2423 and the test pattern 100 to cause the image of the test pattern 100 to be formed on a sensor surface of the two-dimensional sensor 2423; and a reflection member 2426 arranged on the first optical path between the two-dimensional sensor 2423 and the reference pattern 400 to cause a position where the image of the reference pattern 400 is to be formed by the image capturing lens 2425 to be on the sensor surface of the two-dimensional sensor 2423. Meanwhile, the reference pattern 400 and the test pattern 100 are similar to those of the first embodiment, and therefore, repeating the detailed descriptions is omitted.

The image capturing unit 2042 of the third embodiment includes, in the image capturing unit 2042, the reference pattern 400 used for color measurement. The reflection member 2426 causes the position where the image of the reference chart 400 is to be formed and a position where the image of the object test pattern 100 is to be formed to be on the sensor surface of the two-dimensional sensor 2423. That is, the image capturing lens 2425 and the reflection member 2426 cause both the image of the reference chart 400 and the image of the object test pattern 100 to be formed on the sensor surface of the two-dimensional sensor 2423. Accordingly, the image capturing unit 2042 can be used even in a case where the image capturing unit 2042 is to be moved. Furthermore, the image capturing unit 2042 is relatively inexpensive and also capable of increasing accuracy in color measurement of the test pattern 100. The recording apparatus according to the third embodiment will be described in detail below with reference to the accompanying drawings.

An exemplary schematic configuration of mechanisms of the recording apparatus according to the third embodiment is similar to that of the first embodiment described with reference to FIG. 1.

Meanwhile, exemplary configurations of a recording mechanism and a detection mechanism of the recording apparatus according to the third embodiment are similar to those of the first embodiment described above with reference to FIGS. 2 and 3 with a difference only in that a reference numeral of 2042 is assigned to the image capturing unit 2042 in FIG. 20.

More specifically, as in the first embodiment, the recording mechanism according to the third embodiment moves the carriage 5, on which the recording heads 6 are mounted, in the main-scanning direction and causes ink to be ejected through the nozzle arrays of the recording heads 6 onto the recording medium 16 on the supporting plate 200, thereby recording the test pattern 100, which is the object, on the recording medium 16. The test pattern 100 is mainly used for color measurement of an image formed with the ink ejected from the recording heads 6.

The detection mechanism according to the third embodiment captures, as in the first embodiment, an image of the test pattern 100 recorded on the recording medium 16 and an image of the reference chart 400 arranged in the image capturing unit 2042 with the image capturing unit 2042. The detection mechanism compares colors of the image of the test pattern 100 captured by the image capturing unit 2042 with colors of the image of the reference chart 400 captured by the same, thereby performing color measurement of the test pattern 100. The reference chart 400 is mainly used for color measurement of the test pattern 100.

Exemplary Configuration of Image Capturing Unit 2042

An exemplary configuration of the image capturing unit 2042 will be described below with reference to FIG. 21. FIG. 21 is a diagram illustrating the exemplary configuration of the image capturing unit 2042. Section (a) of FIG. 21 illustrates an exemplary configuration of a side surface of the image capturing unit 2042. Section (b) of FIG. 21 illustrates an exemplary configuration of a top surface of the image capturing unit 2042.

The image capturing unit 2042 of the third embodiment includes the housing 2421 having an aperture 2428 on a side facing an image capturing plane, the two-dimensional sensor 2423, a light source (light emitting diode (LED)) 2424, the image capturing lens 2425, the reflection member 2426, a support member 2427, and the reference chart 400.

The housing 2421 is a hull of the image capturing unit 2042. The housing 2421 has the aperture 2428 on the image capturing plane side. As illustrated in section (a) of FIG. 21, the housing 2421 has a rectangular inner surface, on which, as illustrated in section (a) of FIG. 21, the reference chart 400 is arranged. The two-dimensional sensor 2423 captures the image of the reference chart 400 and the image of the object (the test pattern 100) simultaneously to obtain a two-dimensional captured image formed with the image of the reference chart 400 and the image of the test pattern 100. The light source 2424 illuminates the reference chart 400 and the test pattern 100 with light. The image capturing lens 2425 forms an image of an image-capture object on the sensor surface of the two-dimensional sensor 2423. The image capturing lens 2425 is arranged such that an object surface is positioned on the test pattern 100. The reflection member 2426 reflects light and has a predetermined reflectivity. The reflection member 2426 locates a focal plane on the reference chart 400 that is arranged on an inner side surface of the housing 2421. The support member 2427 is a member that supports the reflection member 2426 at a predetermined angle (θ).

In the image capturing unit 2042 of the third embodiment, the image of the test pattern 100 is captured in a first area, which is approximately half the image capturing area, of the two-dimensional sensor 2423. The image of the test pattern 100 is to be formed by the image capturing lens 2425 on the sensor surface of the two-dimensional sensor 2423. The image of the reference chart 400 is captured in a second area, which is approximately a half the image capturing area, of the image capturing area of the two-dimensional sensor 2423. The image capturing lens 2425 and the reflection member 2426 cause the image of the reference chart 400 to be formed on the sensor surface of the two-dimensional sensor 2423.

That is, in the image capturing unit 2042 of the third embodiment, the reflection member 2426 is arranged such that the position where the image of the reference chart 400 is to be formed is on the sensor surface of the two-dimensional sensor 2423.

Furthermore, the image capturing unit 2042 of the third embodiment illuminates the reference chart 400 and the test pattern 100 with light from the light source 2424 and captures the image of the reference chart 400 and the image of the test pattern 100 with the two-dimensional sensor 2423 simultaneously in the same lighting condition.

Figure 21:
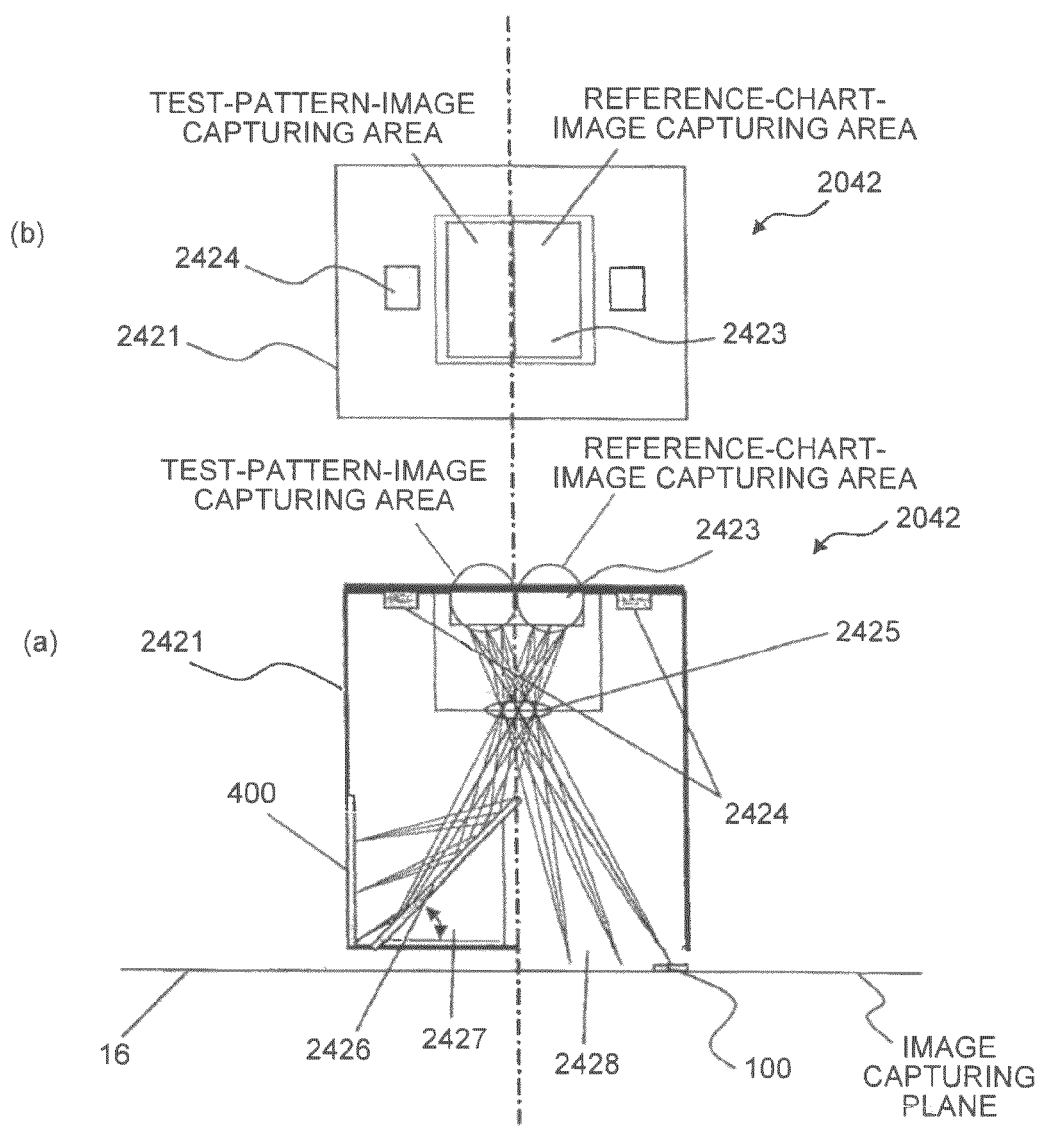
FIG. 21 is a diagram illustrating a first exemplary configuration of an image capturing unit according to the third embodiment.

In the configuration illustrated in FIG. 21, the support member 2427 that supports the reflection member 2426 at the predetermined angle 6 is arranged in the housing 2421, and the reflection member 2426 is mounted on the support member 2427 so that the position where the image of the reference chart 400 is to be formed coincides with the position where the image of the test pattern 100 is to be formed.

Figure 22:
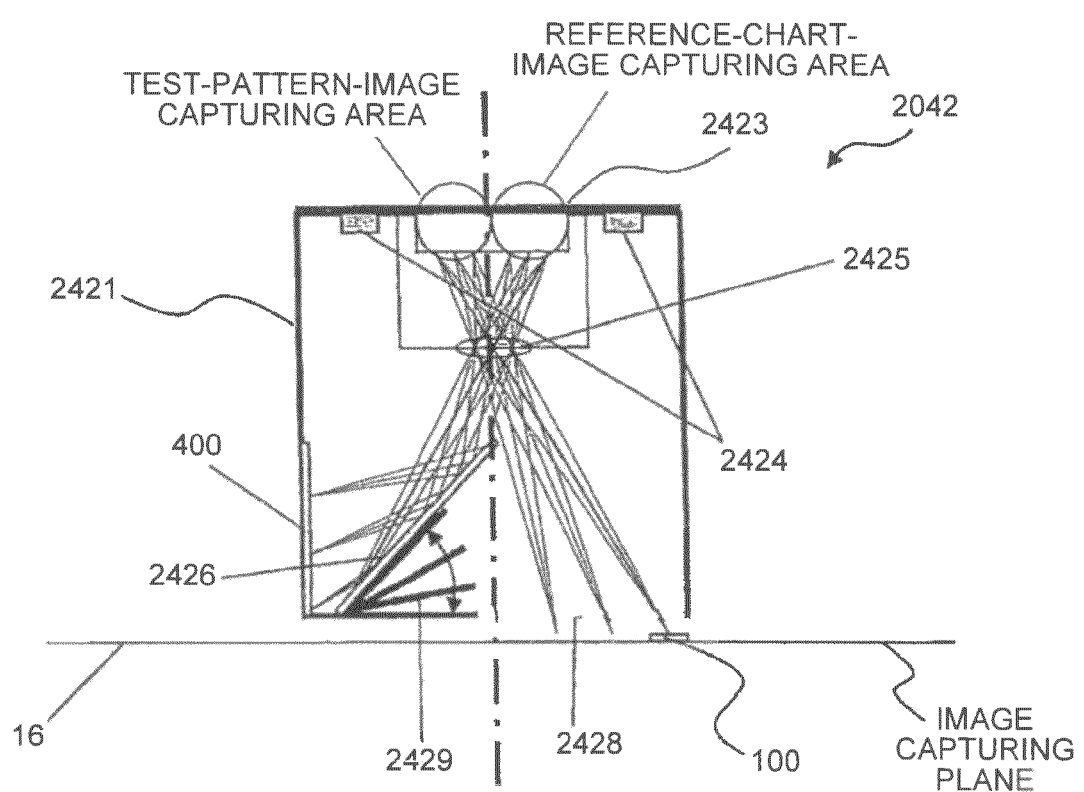
FIG. 22 is a diagram illustrating a second exemplary configuration of the image capturing unit according to the third embodiment.

Another configuration in which, as illustrated in FIG. 22, the reflection member 2426 can be mounted on a portion-of-housing 2429 that is a portion of the housing 2421 on the image capturing plane side and that is foldable in a stepless manner so that the position where the image of the reference chart 400 is to be formed coincides with the position where the image of the test pattern 100 is to be formed. Meanwhile, in the configuration illustrated in FIG. 22, the reflection member 2426 is mounted on the portion-of-housing 2429 that is foldable in the stepless manner. Another configuration in which a material serving as a reflector is applied to the portion-of-housing 2429 that is foldable in the stepless manner so that the portion-of-housing 2429 itself also functions as the reflection member 2426 can alternatively be employed.

Figure 23:
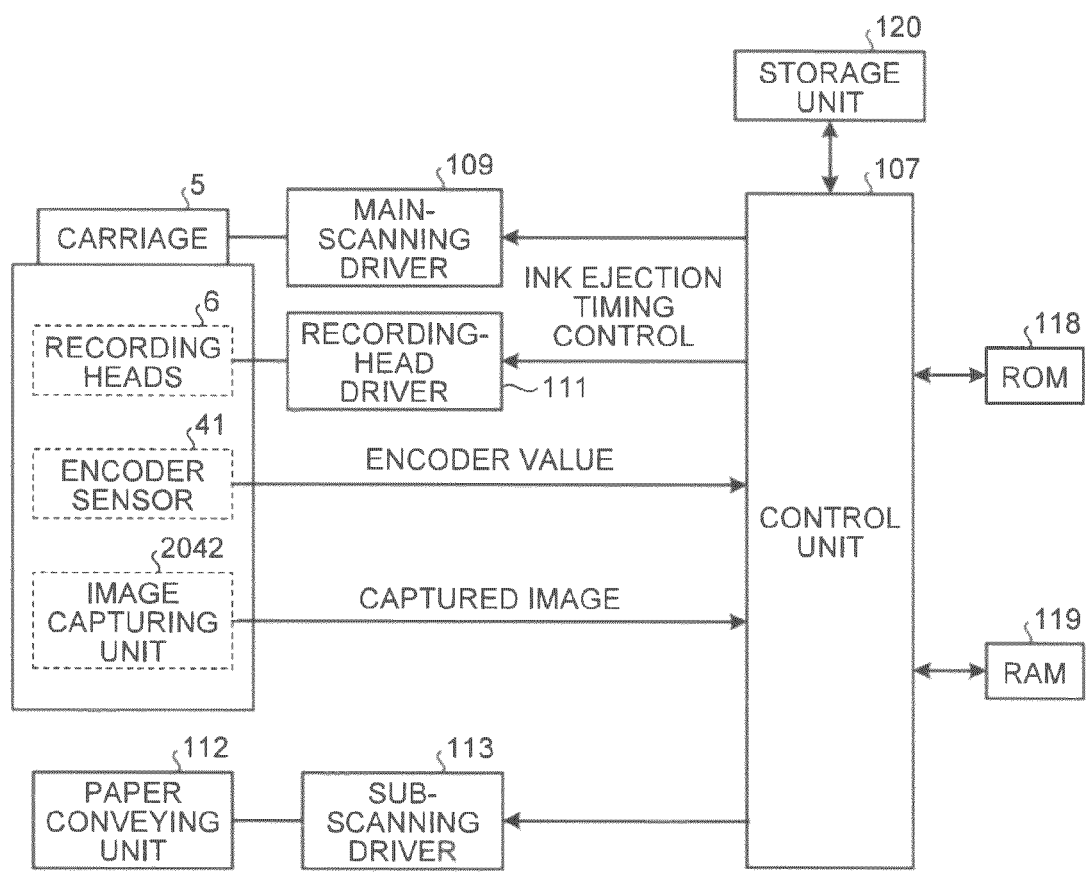
FIG. 23 is a diagram illustrating an exemplary schematic configuration of a control mechanism of the recording apparatus according to the third embodiment.

The control mechanism of the recording apparatus according to the third embodiment includes the control unit 107, the ROM 118, the RAM 119, the storage unit 120, the carriage 5, the main-scanning driver 109, the recording heads 6, the recording-head driver 111, the encoder sensor 41, the image capturing unit 2042, the paper conveying unit 112, and the sub-scanning driver 113 as illustrated in FIG. 23. The functions and configurations of the various units other than the image capturing unit 2042, or, more specifically, the functions and configurations of the control unit 107, the ROM 118, the RAM 119, the storage unit 120, the carriage 5, the main-scanning driver 109, the recording heads 6, the recording-head driver 111, the encoder sensor 41, the image capturing unit 42, the paper conveying unit 112, and the sub-scanning driver 113 are similar to those of the first embodiment.

The image capturing unit 2042 captures the image of the reference chart 400 and the image of the test pattern 100 recorded on the recording medium 16 simultaneously and outputs the captured image formed with the image of the reference chart 400 and the image of the test pattern 100 to the control unit 107. The control unit 107 compares colors of the reference chart 400 with colors of the test pattern 100 based on the captured image captured by the image capturing unit 2042, thereby performing color measurement of the test pattern 100.

In the third embodiment, the configuration of the reference chart 400 (FIG. 6), the method for color measurement of the test pattern 100 (FIG. 7), the RGB output values prior to gray balance adjustment and white balance adjustment (FIG. 8), the differences between the actual RGB output values (solid lines) and the ideal RGB output values (broken line), the ratios of the actual RGB output values to the ideal RGB output values (FIG. 9), the exemplary method for obtaining Lab values from the RGB values obtained from the test pattern 100 (FIGS. 10 to 12), and the method for correcting misalignment of an image (FIGS. 13 to 17) are similar to those of the first embodiment described with reference to the corresponding drawings, and repeated descriptions are omitted.

As described above, the recording apparatus according to the third embodiment records the test pattern 100, which is the object, on the recording medium 16. The recording apparatus causes the image capturing unit 2042 to capture the image of the test pattern 100, which is the object, and the image of the reference chart 400 arranged in the image capturing unit 2042 simultaneously. At this time, the image capturing lens 2425 and the reflection member 2426 cause both the image of the reference chart 400 and the image of the test pattern 100 to be formed on the sensor surface of the two-dimensional sensor 2423. Color measurement of the test pattern 100 is performed by comparing colors of the reference chart 400 with colors of the test pattern 100 based on the captured image captured by the image capturing unit 2042. Accordingly, the image capturing unit 2042 can be used even in a case where the image capturing unit 2042 is to be moved. Furthermore, the image capturing unit 2042 is relatively inexpensive and also capable of increasing accuracy in color measurement of the test pattern 100.

Although the present invention has been described above by way of the preferred embodiments, the present invention is not limited to the specific embodiments described above. Various changes and modifications can be made without departing from the scope of the present invention.

For example, a sequence of operations in one of the embodiments is not necessarily performed only by the single control unit 107, and may be performed by a plurality of control units.

A series of control operations for each of the units that configure the recording apparatus according to one of the embodiments can be performed by any of hardware, software, and a compound configuration of hardware and software.

To execute processing by software, computer program that record processing sequence can be installed on a memory of a computer incorporated into dedicated hardware and executed. Alternatively, the computer program can be installed and executed on a general-purpose computer capable of performing various types of processing.

For example, the computer program can be stored in advance in a hard disk drive or ROM, which serves as a storage medium. Alternatively, the computer program can be temporarily or permanently stored (recorded) in a removable storage medium. Using a removable storage medium, the computer program can be provided as what is called a software package. Examples of the removable storage medium include a floppy disk (registered trademark), a compact disk ROM (CD-ROM), a magneto optical (MO) disk, a digital versatile disk (DVD), a magnetic disk, and a semiconductor memory.

The computer program can be installed from a removable storage medium as described above to a computer. The computer program can be transferred from a site, from which the computer program is downloadable, to the computer wirelessly or in a wired manner through a network.

The recording apparatus according to the present embodiment is not limited to a serial processing by following the series of processes described above, and can also be configured to perform processing by one of parallel processing and individual processing.

The present invention is suitable for inkjet recording apparatus.

The present invention has been conceived in view of the circumstances described above. It is an object of the invention to provide an image capturing device that can be used even in a case where the image capturing device is to be moved, and that is relatively inexpensive and capable of increasing accuracy in color measurement, and also to provide a recording apparatus including the image capturing device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing device comprising:
   a housing;
   a reference pattern used for color measurement, the reference pattern being arranged in the housing;
   an image capturing element that captures an image of the reference pattern in a first area of an image capturing area and an image of an object in a second area of the image capturing area;
   an image forming element that causes the image of the reference pattern and the image of the object to be formed on the image capturing element, the image forming element being arranged on a first optical path between the image capturing element and the reference pattern and a second optical path between the image capturing element and the object; and
   an optical member that guides any one of the image of the reference pattern and the image of the object so that the image of the object formed by the image forming element and the image of the reference pattern formed by the image forming element are to be formed on an element surface of the image capturing element.

2. The image capturing device according to claim 1, wherein
   the image forming element causes the image of the reference pattern to be formed on the element surface of the image capturing element, and
   the optical member is a transparent member having a refractive index, with which the transparent member causes the image forming element to form the image of the object on the element surface of the image capturing element, the transparent member being arranged on the second optical path between the image capturing element and the object.

3. The image capturing device according to claim 2, wherein the refractive index of the transparent member is determined based on a length of the transparent member, a distance between a top portion of the image forming element and an image capturing plane, on which the object is to be located when the reference pattern is in conjugate relationship with the image capturing element, and a distance between the top portion of the image forming element and the reference pattern when the reference pattern is in conjugate the relationship with the image capturing element.

4. The image capturing device according to claim 3, wherein the transparent member is arranged so as to satisfy a following equation, $$L=Lc+Lp(1-1/n),$$

where Lp is the length of the transparent member, L is the distance between the top portion of the image forming element and the image capturing plane on which the object is to be located when the reference pattern is in the conjugate relationship with the image capturing element, Lc is the distance between the top portion of the image forming element and the reference pattern when the reference pattern is in the conjugate relationship with the image capturing element, and n is the refractive index.

5. The image capturing device according to claim 2, further comprising a light source that illuminates the reference pattern and the object, wherein the image capturing element captures the image of the reference pattern and the image of the object simultaneously, the reference pattern and the object being illuminated with the light from the light source.

6. The image capturing device according to claim 5, further comprising a light-shielding plate that prevents direct illumination of the reference pattern and the object with the light emitted from the light source.

7. The image capturing device according to claim 6, wherein the housing includes an inner surface, the inner surface including a diffusing surface that diffuses the light from the light source such that the light diffused by the diffusing surface illuminates the reference pattern and the object.

8. The image capturing device according to claim 2, wherein the inner surface of the housing has a circular form.

9. The image capturing device according to claim 2, further comprising an aperture in the housing, the aperture being on a side where the object is provided, wherein the transparent member is arranged in the housing so as to cover the aperture.

10. The image capturing device according to claim 1, wherein
the image forming element causes the image of the object to be formed on the element surface of the image capturing element, and
the optical member is a reflection member that causes the position where the image of the object is to be formed to coincide with the position where the image of the reference pattern is to be formed, the reflection member being arranged on the first optical path between the image capturing element and the reference pattern.

11. The image capturing device according to claim 10, further comprising a light source that illuminates the reference pattern and the object, wherein the image capturing element captures the image of the reference pattern and the image of the object simultaneously, the reference pattern and the object being illuminated with the light from the light source.

12. The image capturing device according to claim 10, further comprising a support member that supports the reflection member at a predetermined angle, the support member being arranged in the housing, wherein the reflection member is arranged on the support member at a predetermined angle.

13. The image capturing device according to claim 10, wherein
a portion of the housing is foldable in a stepless manner, the portion being on a side where the object is provided, and
the reflection member is any one of a reflection member arranged on the portion of the housing and a reflection member formed on the portion of the housing, the portion of the housing being folded at a predetermined angle.

14. A recording apparatus comprising:
a carriage; and
an image capturing device, wherein
the image capturing device includes
a housing;
a reference pattern used for color measurement, the reference pattern being arranged in the housing;
an image capturing element that captures an image of the reference pattern in a first area of an image capturing area and an image of the object in a second area of the image capturing area;
an image forming element that causes an image of the reference pattern and an image of the object to be formed on the image capturing element, the image forming element being arranged on a first optical path between the image capturing element and the reference pattern and a second optical path between the image capturing element and the object; and
an optical member that guides any one of the image of the reference pattern and the image of the object so that an image of the object formed by the image forming element and an image of the reference pattern formed by the image forming element are to be formed on an element surface of the image capturing element, and
the image capturing device is mounted on the carriage.

* * * * *